(12) United States Patent
Pryakhin et al.

(10) Patent No.: US 11,536,578 B2
(45) Date of Patent: Dec. 27, 2022

(54) PATH DATA FOR NAVIGATION SYSTEMS

(71) Applicant: Harman Becker Automotive Systems GmbH, Karlsbad (DE)

(72) Inventors: Alexey Pryakhin, Munich (DE); Stefan Posner, Munich (DE); Stefan Eggers, Wentorf (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 299 days.

(21) Appl. No.: 16/875,830

(22) Filed: May 15, 2020

(65) Prior Publication Data
US 2020/0370900 A1 Nov. 26, 2020

(30) Foreign Application Priority Data
May 22, 2019 (DE) .................... 10 2019 113 685.7

(51) Int. Cl.
*G01C 21/34* (2006.01)
*G06F 16/29* (2019.01)
*G08G 1/0968* (2006.01)

(52) U.S. Cl.
CPC ......... *G01C 21/3446* (2013.01); *G06F 16/29* (2019.01); *G08G 1/096844* (2013.01)

(58) Field of Classification Search
CPC ............... G01C 21/3446; G01C 21/3896; G01C 21/20; G06F 16/29; G08G 1/096844
See application file for complete search history.

(56) References Cited

U.S. PATENT DOCUMENTS

| | | | | |
|---|---|---|---|---|
| 6,049,753 A | * | 4/2000 | Nimura | G01C 21/3484 701/428 |
| 2012/0128214 A1 | * | 5/2012 | Satoh | G01C 21/32 382/113 |

(Continued)

FOREIGN PATENT DOCUMENTS

| | | | | |
|---|---|---|---|---|
| CN | 1584503 A | * | 2/2005 | ......... G01C 21/3415 |
| CN | 102636173 A | * | 8/2012 | ............. G01C 21/32 |

(Continued)

OTHER PUBLICATIONS

European Patent Office, Extended European Search Report Issued in Application No. 20169359.5, dated Oct. 13, 2020, Germany, 9 pages.

*Primary Examiner* — Mary Cheung
(74) *Attorney, Agent, or Firm* — McCoy Russell LLP

(57) ABSTRACT

Disclosed herein are methods for decoding path data. The methods may comprise providing a navigation database for storing topological information of a road network. The navigation database comprises a plurality of road links, and a plurality of link nodes, each link node defining a topological connection between two or more of the road links. The methods may further comprise receiving path data indicative of a path within the road network, wherein the path data comprises a start identifier, a link count, and at least one exit number. The methods may further comprise selecting, from the navigation database, one road link of the plurality of the road links as a start road link of the path based the start identifier. Moreover, the methods may comprise iteratively expanding the path with selected road links until the link count is equal to the number of road links of the path.

18 Claims, 18 Drawing Sheets

(56) References Cited

U.S. PATENT DOCUMENTS

2013/0226454 A1* 8/2013 Hisano .................... G06N 5/02
701/533
2013/0325342 A1   12/2013 Pylappan et al.
2016/0370192 A1* 12/2016 Maischberger ........ G01C 21/32

FOREIGN PATENT DOCUMENTS

| CN | 105387863 B | * | 10/2018 | | |
|----|-------------|---|---------|---|---|
| EP | 2385348 A2 | * | 11/2011 | ............. | G01C 21/32 |
| JP | 2004053441 A | * | 2/2004 | | |
| JP | 2005221781 A | * | 8/2005 | | |

* cited by examiner

PATH DATA FOR NAVIGATION SYSTEMS

CROSS-REFERENCE TO RELATED APPLICATIONS

The present application claims priority to German Application No. DE 10 2019 113 685.7, entitled "PATH DATA FOR NAVIGATION SYSTEMS", and filed on May 22, 2019. The entire contents of the above-listed application is hereby incorporated by reference for all purposes.

TECHNICAL FIELD

The disclosure relates to the field of navigation, and more particularly is directed to a navigation apparatus, a navigation server, a data structure for transmitting path data, a computer-implemented method for encoding path data, and a computer-implemented method for decoding path data.

BACKGROUND

Modern navigation apparatuses such as car navigation systems are based on map data with a (digital) map that provides information on, inter alia, a road network with road segments, their connectivity, and possibly additional information such as length of the road segment or direction of traffic flow at a road segment. More generally, such road segments may be regarded as road links which are connected to each other at link nodes. So, e.g., a road junction may be regarded as a link node, wherein more than two road links are connected at this link node.

Typically, modern navigation services provide (e.g., by a navigation server) navigation information such as traffic information, routes, or parking spots. Such information is typically relevant for a part of the road network and, thus, is spatial information. For example, at a road or a part of a route, which may be regarded as a path within the road network, there may be a traffic jam. For example, along the path there may be a danger point such as an accident or a broken car at a location within the path. When transferring such navigation information, spatial information for relevant locations such as the traffic jam or the danger point may also be encoded, which may be called location referencing.

Traffic Message Channel (TMC) encodes the spatial information based on predetermined (e.g., standardized) location codes for a multitude of pre-coded locations, wherein a relevant location is encoded by looking up a corresponding location code (e.g., by a navigation server), wherein this corresponding location code is transferred (e.g., to a navigation apparatus), and wherein the relevant location is decoded by looking up a location within the map that matches with the transferred location code (e.g., by the navigation apparatus).

Another technique for transferring navigation information including spatial information is OpenLR (Open Location Referencing, see http://www.openlr.org). OpenLR is a map-agnostic location referencing method, which means that encoder and decoder, respectively, can operate on map databases with different versions or from different vendors. OpenLR encodes relevant locations, which are bound to the road network, by shortest paths between coordinates that are specified in the WGS 84 format (World Geodetic System: WGS 84).

SUMMARY

There is a demand to facilitate encoding, transferring, and decoding spatial data for navigation information, and more particularly to encode spatial information and/or to provide a data structure for spatial information such that detailed spatial information may efficiently be transferred and/or decoded.

This demand may be met by the teaching of the independent claims, e.g., by a computer-implemented method for decoding path data, by a computer-implemented method for encoding path data, by a navigation apparatus, and by a navigation server. Various embodiments, advantageous modifications, and further improvements are provided by the teachings of the dependent claims.

A first aspect of the present disclosure is directed to a computer-implemented method for decoding path data. The method comprises providing a navigation database for storing topological information of a road network. The navigation database comprises a plurality of road links, each road link having a start point and an end point, and a plurality of link nodes, each link node defining a topological connection between two or more of the road links and an order of the two or more connected road links. The method further comprises receiving path data indicative of a path within the road network, wherein the path data comprises a start identifier, a link count, and at least one exit number. The method further comprises selecting, from the navigation database, one road link of the plurality of the road links as a start road link of the path based on the start identifier. Moreover, the method comprises iteratively expanding the path with selected road links until the link count is equal to the number of road links of the path. An iteration of the expanding comprises determining whether more than one road link of the plurality of road links is connected to the selected road link based on the plurality of link nodes. An iteration of the expanding further comprises selecting one of the road links connected to the selected road link based on the at least one exit number and the order of connected road links, if more than one road link is connected to the selected road link. Furthermore, if exactly one road link is connected to the selected road link, an iteration of the expanding comprises selecting the exactly one connected road link.

An advantage of path data comprising the start identifier, the link count, and the at least one exit number may be that an amount of data for transferring this path data is typically smaller than an amount of data required for other techniques for transferring navigation information such as OpenLR, whereby efficiency of transferring this path data may be increased. Moreover, an advantage of decoding the path data based on the navigation database by iteratively expanding the path may be that this decoding is computationally efficient and/or requires less computational resources than, e.g., searching specific/relevant locations within the navigation database or within map data based on shortest paths and coordinates, which may allow to decode the path data in a navigation apparatus with limited computational resources such as a head unit of a car navigation system. By the (decoded) path, which comprises the selected road links (e.g., a chain of connected road links including the start road link), detailed spatial information may be provided. This may allow a more precise location referencing (e.g., specifying one or more relevant locations or a part of the road network) than encoding spatial information by a limited number of predetermined location codes. Hence, an advantage of the method may be that spatial information for navigation such as locations of parking spots, routes, traffic information (such as a hazard warning, availability of transportation means, routes or paths or sections of them with traffic jam), or any other information being localized on/near the road network (such as a local weather report, or sights at or near the road network) may be transferred and decoded with increased level of spatial detail in a data and computational efficient manner.

A second aspect of the disclosure is directed to a computer-implemented method for encoding path data. The method comprises providing at least one database for storing topological information of a road network, wherein the database comprises a plurality of road links, each road link having a start point and an endpoint, and a plurality of link nodes, each link node defining a topological connection between two or more of the road links and an order of the two or more connected road links. The method further comprises establishing an identifier path for the at least one database, wherein the identifier path comprises a linear chain of identifiers of road links, wherein a start road link is identified by the first element of the chain, and wherein road links identified by adjacent elements of the chain are connected at a link node of the plurality of link nodes. The method further comprises determining, as a start identifier, the first element of the chain, and determining, as a link count, the number of elements of the chain. The method further comprises determining, for each element of the chain and starting from the first element, at which of the plurality of link nodes a road link identified by the respective element is connected to a next road link identified by an element of the chain next to the respective element; determining whether the road link identified by the respective element is connected to more than one road link of the plurality of road links at the link node; if this is the case, determining an at least one exit number, wherein the at least one exit number is a position of the next road link within the order of the two or more connected road links at the link node.

The embodiments, advantageous modifications, and further improvements as described in detail in connection with the first aspect of the disclosure as well as potential benefits and advantages also apply correspondingly to the method for encoding path data according to the disclosure.

A third aspect of the disclosure is directed to a data structure for transferring path data. The data structure comprises a data field indicative of a start identifier, a data field indicative of a link count, and a data field indicative of at least one exit number.

The embodiments, advantageous modifications, and further improvements as described in detail in connection with the preceding aspects of the disclosure as well as potential benefits and advantages also apply correspondingly to the data structure according to the disclosure.

A fourth aspect of the disclosure is directed a navigation apparatus comprising a data processing apparatus and being adapted to perform, controlled by the data processing apparatus, the method according to the first aspect of the disclosure.

The embodiments, advantageous modifications, and further improvements as described in detail in connection with the preceding aspects of the disclosure as well as potential benefits and advantages also apply correspondingly to the navigation apparatus according to the disclosure.

A fifth aspect of the disclosure is directed a navigation server comprising a data processing apparatus and being adapted to perform, controlled by the data processing apparatus, the method according to the second aspect of the disclosure.

The embodiments, advantageous modifications, and further improvements as described in detail in connection with the preceding aspects of the disclosure as well as potential benefits and advantages also apply correspondingly to the navigation server according to the disclosure.

The above summary is merely intended to give a short over-view of some features of some embodiments and implementations and is not to be construed as limiting. Other embodiments may comprise other features than the ones explained above.

BRIEF DESCRIPTION OF THE DRAWINGS

The above and other embodiments, advantageous modifications, further improvements, elements, features, steps and characteristics of the present disclosure will be more apparent from the following detailed description of exemplary embodiments and the appended figures. When not stated otherwise or following otherwise from the context, like reference signs refer to corresponding apparatuses, elements or features of the exemplary embodiments and throughout the figures.

DETAILED DESCRIPTION

In the following, various embodiments of the invention will be described in detail with reference to the appended figures. It is to be understood that the following description of embodiments is not to be taken in a limiting sense. The scope of the invention is not intended to be limited by the embodiments described hereinafter or by the figures, which are taken to be illustrative only.

The figures are to be regarded as being schematic representations and elements illustrated in the figures, which are not necessarily shown to scale. Rather, the various elements are represented such that their function and their general purpose become apparent to a person skilled in the art. Unless otherwise indicated, any connection or coupling between functional blocks, devices, components, or other physical or functional units shown in the figures or described herein may also be implemented by an indirect connection or coupling. A coupling between components may be established over a wireless connection. Functional blocks may be implemented in hardware, firmware, software, or a combination thereof.

Figure 1:
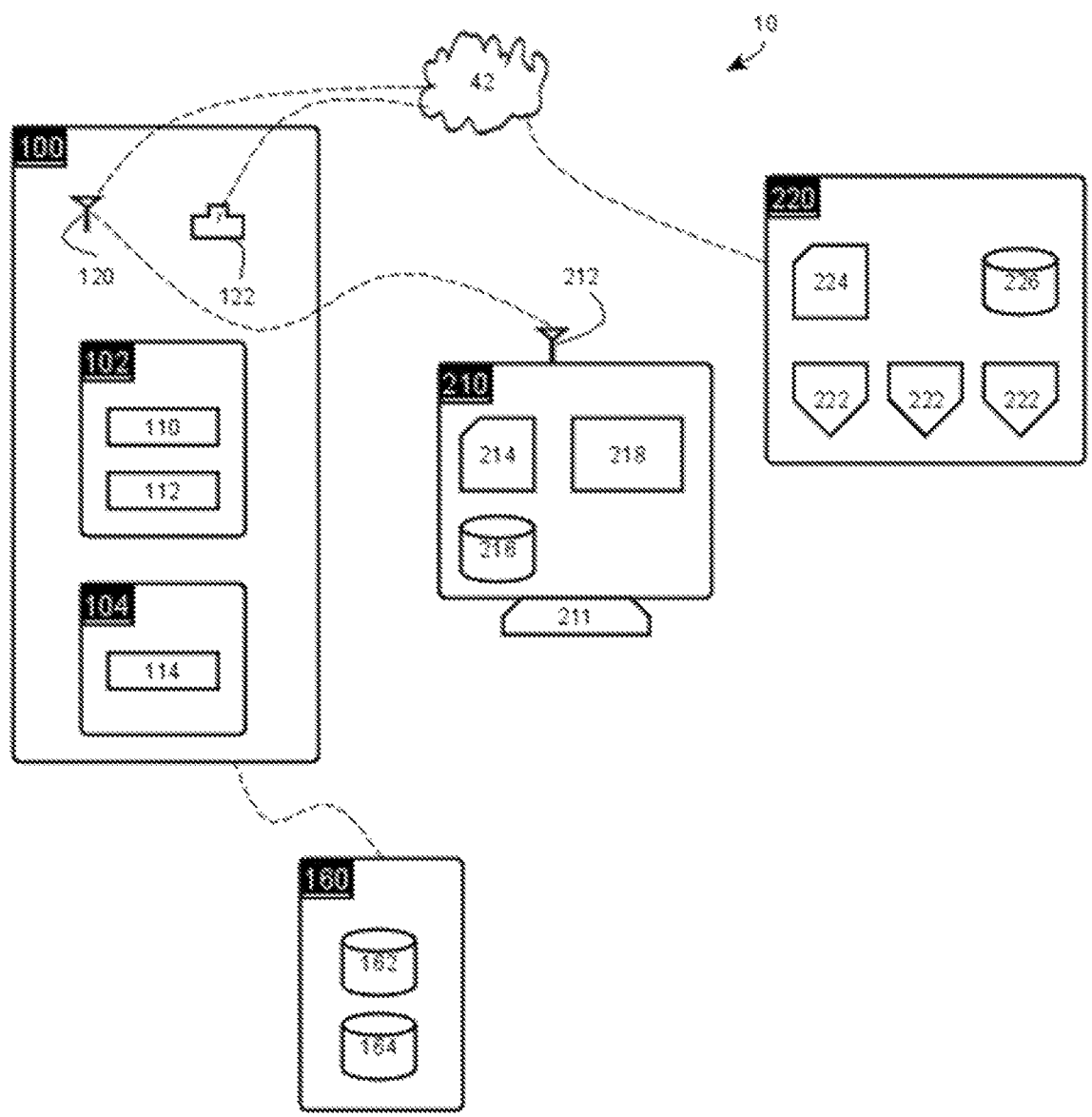
FIG. 1 schematically illustrates a system with a navigation server and navigation apparatuses according to an embodiment.

In FIG. 1, a system 10 adapted to encode, transfer, and decode path data according to an embodiment of the disclosure is schematically illustrated.

In an exemplary embodiment, the data network comprises a navigation server 100 for encoding path data as well as a first navigation apparatus 210 and a second navigation apparatus 220 for decoding path data.

The navigation server 100 may comprise a wireless communication interface 120 such as a 5G modem with antenna and a wired communication interface such as a wired network interface 122. The navigation server 100 may be adapted to communicate (e.g., transmit and receive data) with the first navigation apparatus 210 and the second navigation apparatus 220 directly, via a wireless infrastructure such as a 5G network, and/or via the Internet 42 (FIG. 1 also illustrates the Internet 42, which may be part of the system 10 in some embodiments).

The first navigation apparatus 210 may be implemented as a standalone navigation device. The first navigation apparatus 210 may comprise a wireless communication interface 212 (such as a 5G modem with antenna), a data processing apparatus 214, a navigation database 216 (which may be stored on a storage devices of the navigation apparatus), and a touchscreen 218 (for displaying a decoded path and parts of a map stored in the navigation database 216 and for receiving an input from a user of the navigation apparatus). Moreover, the first navigation apparatus 210 may comprise a stand 211, which may be adapted for mounting the navigation apparatus on a car dashboard. The first navigation apparatus 210 may be adapted to establish, controlled by the data processing apparatus 214 and via the wireless communication interface 212, a point-to-point connection with the navigation server 100.

The second navigation apparatus 220 may be implemented as a head unit of a car navigation system. The second navigation apparatus 220 may comprise a data processing apparatus 224, a navigation database 226, and one or more data interfaces 222 for establishing data connections with other components of the car or the car navigation system, such as a display, a GPS receiver, a user interface, or a communication device. The communication device may be adapted to establish a data connection to the Internet 42 (e.g., a point-to-point connection via the Internet 42 to the navigation server 100).

The navigation server 100 may further comprise a first server computer 102 and a second server computer 104. Furthermore, the navigation server may comprise a database system 160, or is at least adapted to be data connected to a database system 160 of the system 10. The database system 160 may comprise at least one database 162 for storing topological information of a road network and a further database 164 for storing topological information of a role network, wherein the database 162 matches with the navigation database 216, and wherein the database 164 matches with the navigation database 226. Hence, in some implementations, an identifier of navigation database 216 may match with database 162, and an identifier of navigation database 226 may match with database 164. In some implementations, database 162 and navigation database 216 are equal, and/or database 164 and navigation database 226 are equal. Alternatively, navigation database 216 may store additional information such as map data, whereas database 162 may not necessarily store additional information besides topological information of a road network, wherein the database 162 may comprise a plurality of road links, each road link having a start point and an endpoint, and a plurality of link nodes, each link node defining a topological connection between two or more of the road links and an order of the two or more connected road links. By the topological information of the road network, a map and corresponding map data may be abstracted, such that the remaining information is sufficient for the encoding of the path data, which may render the encoding more efficient and/or may mitigate licensing issues of the navigation database 216 comprising all data including map data, pictures, and descriptions as well as the topological information. Correspondingly, the database 164 and the navigation database 226 may be implemented.

The first server computer 102 may comprise two data processing apparatuses 110 and 112. The second server computer 104 may comprise one a data processing apparatus 114. The navigation server 100 may be adapted to perform a method according to the second aspect of the disclosure, wherein method steps of this method are controlled by at least one of the data processing apparatuses 110, 112, 114, and wherein data such as path data is transmitted to a navigation apparatus such as the first navigation apparatus 210 or the second navigation apparatus 220 via at least one of the communication interfaces 120 and/or 122. In some implementations, each of the server computers 102, 104 may be adapted to perform the method, whereby active redundancy and/or load-balancing may be facilitated.

The first navigation apparatus 210 may be adapted to perform a method according to the first aspect of the disclosure, wherein method steps of this method are controlled by the data processing apparatus 214, and wherein data such as path data is received from the server 100 via the wireless communication interface 212. Moreover, a data processing apparatus (e.g., the data processing apparatus 110) and/or a navigation apparatus (e.g., the first navigation apparatus 210) may be adapted to display the decoded path and a corresponding map or a part thereof to a user by means of the touchscreen 218.

Correspondingly, the second navigation apparatus 220 may be adapted to perform a method according to the first aspect of the disclosure, wherein the second navigation apparatus 220 utilizes, via the interfaces 222, one or more components of the car navigation system or a car for communicating with the navigation server 100 and/or for interacting with the user, such as a driver of the car.

Figure 2:
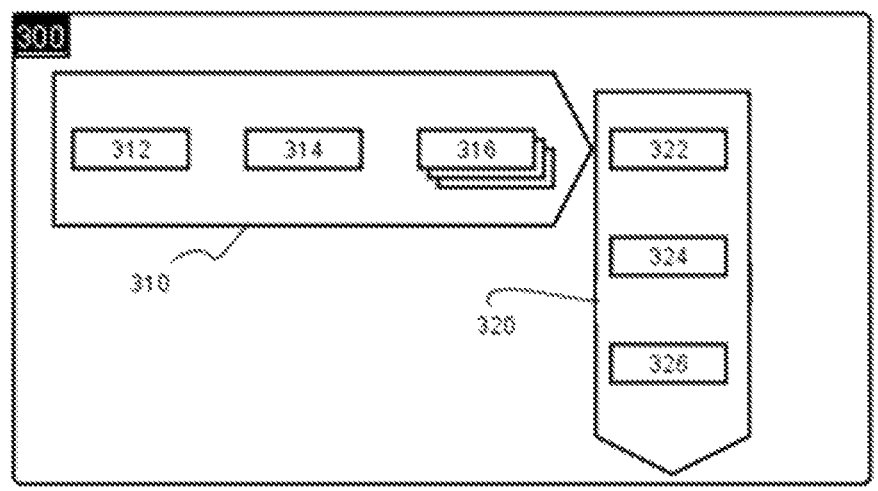
FIG. 2 schematically illustrates a data structure for transmitting path data according to an embodiment.

In FIG. 2, a data structure 300 for transmitting path data according to an embodiment of the disclosure is schematically illustrated.

In an exemplary embodiment, the data structure 300 comprises two sub-structures for two sub-paths of a path encoded in path data that is structured according to the data structure. The first sub-structure 310 of the data structure for a first sub-path of the path may comprise a data field 312 for a start identifier, a data field 314 for a link count, and a data field 316 for a list of exit numbers. Correspondingly, the second sub-structure 320 may comprise corresponding data fields 322, 324 and 326 for a second sub-path of the path.

Figure 3:
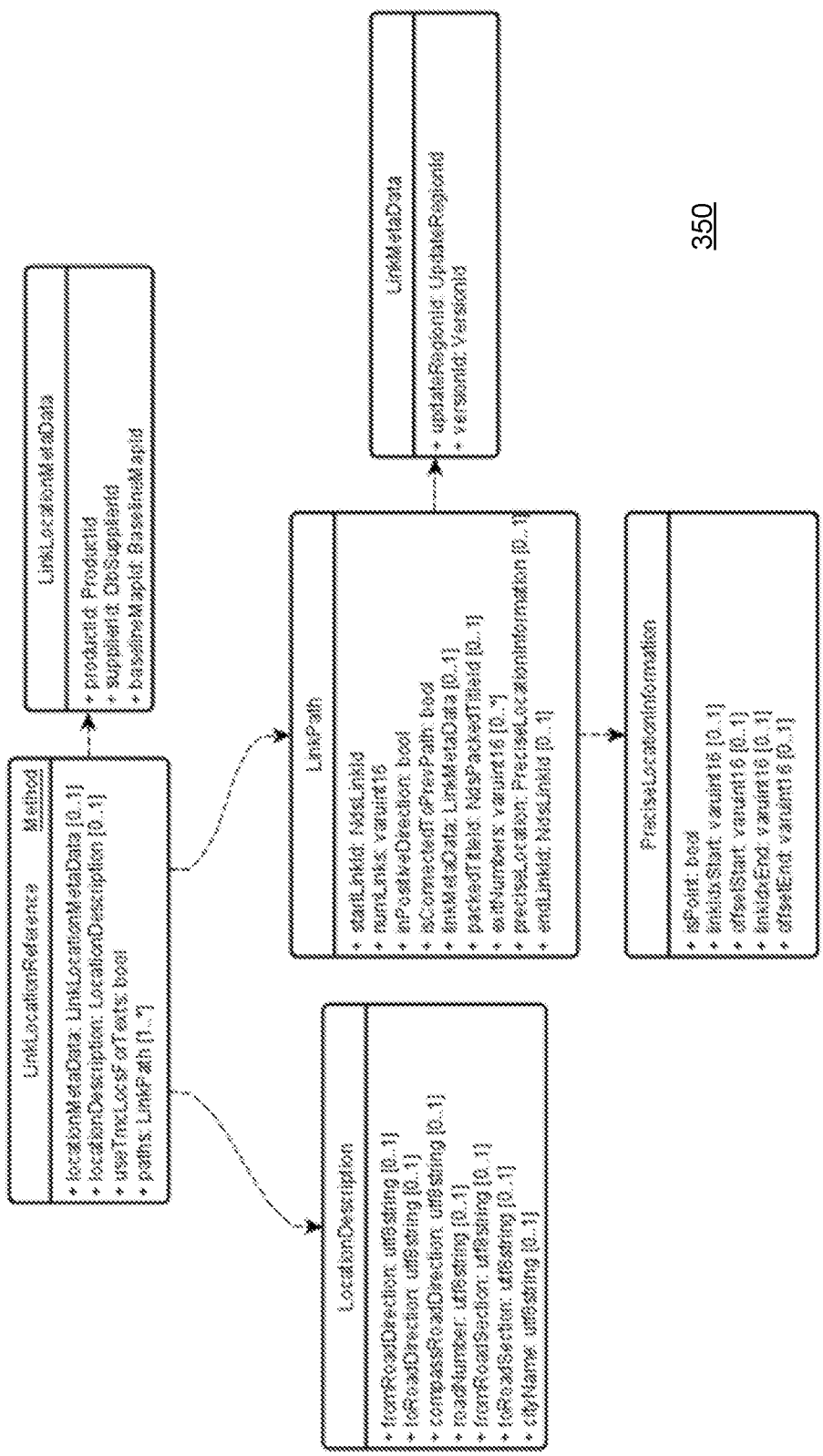
FIG. 3 represents a diagram with methods and data structures for decoding path data according to an embodiment.

FIG. 3 represents a diagram 350 with methods and data structures for decoding path data according to an embodiment of the disclosure.

At least with regard to FIG. 3, the method for decoding path data may also be called "LinkLocationReference", the path data may also be called "LinkPath", and additional data of the path data specifying a path location or a path section may be referenced by the path data (e.g., by a data field refer to as "preciseLocation") and may be called "PreciseLocationInformation". Moreover, the start identifier may be referred to as "startLinkId", the link count may be referred to as "numLinks", a direction of traffic flow of a road link may be indicated by a data field referred to as "isPositiveDirection", an off-road indicator (e.g., being indicative of a gap between two sub-paths) may be referred to as "isConnectedToPrevPath", the at least one exit number or the list of exit numbers may be referred to as "exitNumbers", and the end identifier may be referred to as "endLinkId". For the PreciseLocationInformation a data field referred to as "isPoint" may indicate whether this PreciseLocationInformation provides data for a path section or a path location. Moreover, for the PreciseLocationInformation, the location index and/or the section start index may be referred to as "linkIdxStart", the location offset and/or the section start offset may be referred to as "offsetStart", the section end index may be referred to as "linkIdxEnd", and the section end offset may be referred to as "offsetEnd". Moreover, an identifier of the navigation database may be provided by a data feed referred to as "LinkLocationMetaData". Moreover, for providing additional navigation information a data field referred to as "LocationDescription" may be received and processed by the method for decoding path data. Moreover, the method may implement a version signaling and checking, e.g., based on the LinkLocationMetaData and/or a data field referred to as "LinkMetaData". In some implementations, such a versioning mechanism—e.g., a versioning mechanism of a LLR-library (Link Location Reference library)—may be used to signal the version of the LLR in use; e.g., version check and then acceptance or refusal of a received LLR may be done with the LLR-library.

Moreover, in some implementations, the data structure for LLR may be transmitted—e.g., to the navigation apparatus—using an NDS binary blob. In some further modifications, this binary blob may be beneficially combined with a data protocol according to TPEG (Transport Protocol Experts Group—data protocol for traffic and travel related information). If used together with the TPEG protocol this blob may be transported inside the TPEG LocationReferencingContainer as NDSLocationReference (see LocationReferencingContainer (TPEG2-LRC_2.2).

Data structures illustrated in FIG. 3 may, in some implementations, be described by data script definitions substantially similar to those described in the accompanying Computer Program Listing appendix.

Figure 4:
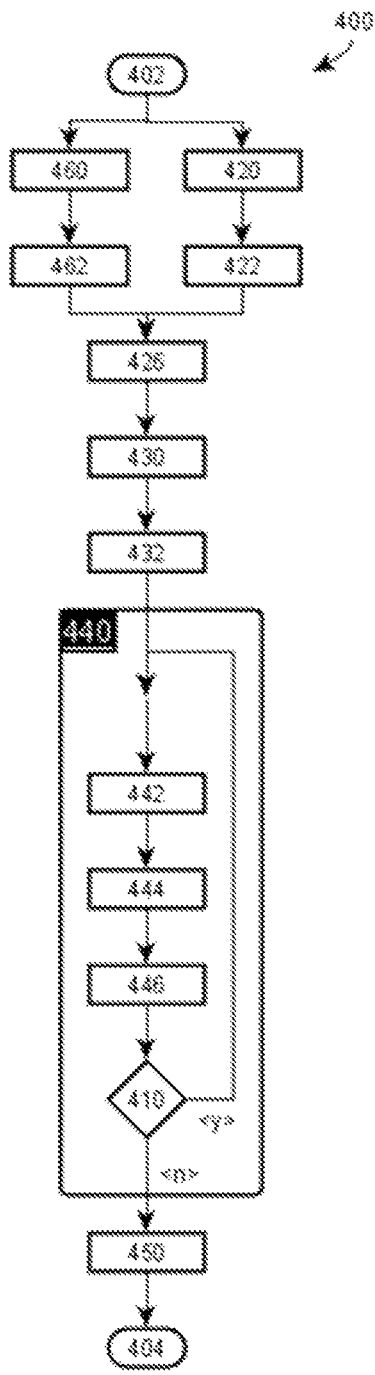
FIG. 4 represents a flowchart of a method for encoding path data according to an embodiment.

FIG. 4 shows a flowchart of a method 400 for encoding path data, the method according to an embodiment of the disclosure.

In an exemplary embodiment the method 400 may comprise method steps 420, 422, 426, 430, 432, 440, 442, 444, 446, 450, 460, and/or 462, and may comprise a method condition 410. The method 400 starts at the start of the method 402 and ends at the end of the method 404. Furthermore, one or more of the method steps, e.g., a sequence of method steps and/or the whole method 400, may repeatedly be performed. In some implementations, the method may be performed by a navigation server according to an embodiment of the disclosure. Moreover, in some implementations, the navigation server 100 may be adapted to perform the method 400.

In step 420, an identifier for a navigation database may be received from a navigation apparatus. For example, the navigation server 100 may receive the identifier from the navigation apparatus 210, wherein the identifier is indicative of the navigation database 216. For example, the navigation server 100 may receive the identifier from the second navigation apparatus 220, wherein the identifier is indicative of the navigation database 226.

In step 422, a plurality of databases may be provided, wherein each of the databases is adapted for storing topological information of a road network and comprises a plurality of road links, each road link having a start point and an endpoint, and a plurality of link nodes, each link node defining a topological connection between two or more of the road links and an order of the two or more connected road links. For example, the navigation server 100 may establish a data connection to the database system 160 and access the database 162 as an at least one database and/or the database 164 as a further database.

In step 460, e.g., after, parallel to or before steps 420 or 422, traffic data with spatial information may be received. In some implementations, the traffic data may be provided by an external traffic data provider and may be in a foreign a data format such as TMC or OpenLR.

In some implementations, in step 462, e.g., parallel to or before steps 420 or 422, a plurality of identifier paths may be established, wherein for each of the plurality of databases an identifier path is established, and wherein the respective identifier path comprises a linear chain of identifiers of road links of the respective database. Furthermore, for each of the identifier paths, a start road link may be identified by the first element of the chain, and road links that are identified by adjacent elements of the chain may be connected at a link node of the plurality of link nodes of the respective database.

Alternatively, in other implementations of step 462, an identifier path may be established after steps 420 and 422 and may be established for the identifier of the navigation database received in step 420.

In step 426, a matching database of the plurality of databases may be determined which matches with the identifier of the navigation database. For example, the server 100 may be adapted to determine whether the received identifier for the navigation database matches with database 162 or with database 164. If no match is found, an error signal may be provided and/or the method is stopped or repeated for a potentially different identifier.

In step 430, the first element of the chain of the identifier path for the matching database may be determined as a start identifier for the matching database.

In step 432, the number of elements of the chain of the identifier path for the matching database may be determined as a link count for the matching database.

In step 440, a list of exit numbers for the matching database may be iteratively determined, wherein step 440 comprises the steps 442, 444 and 446 and the method condition 410, and wherein the iterating is started from the first element of the chain and an iteration counter is set to one.

In step 442, a current link node from the plurality of link nodes may be looked up in the matching database, wherein the current link node defines the topological connection between a current road link, wherein the current road link is identified by the element of the chain at the position according to the iteration counter and a successor (e.g., next) road link, wherein the successor road link is identified by the element of the chain at the position according to the iteration counter plus one.

In step 444, it may be determined whether the current road link is connected, at the link node, to more than one road link of the plurality of road links of the matching database.

In step 446, an exit number may be appended to the list of exit numbers, if the current road link is connected to more than one road link, wherein the exit number is a position of the successor road link within the order of the two or more connected road links at the current link node.

At method condition 410, it may be determined whether the iteration counter smaller than the number of elements of the chain. In this case—symbolized by <y>—the iteration count is increased by one and a next iteration is started at step 442. Otherwise—symbolized by <n>—the iterating stops and the method 400 is continued at step 450.

At step 450, path data comprising the start identifier, the link count, and the list of exit numbers may be established and transmitted to the navigation apparatus.

Figure 5:
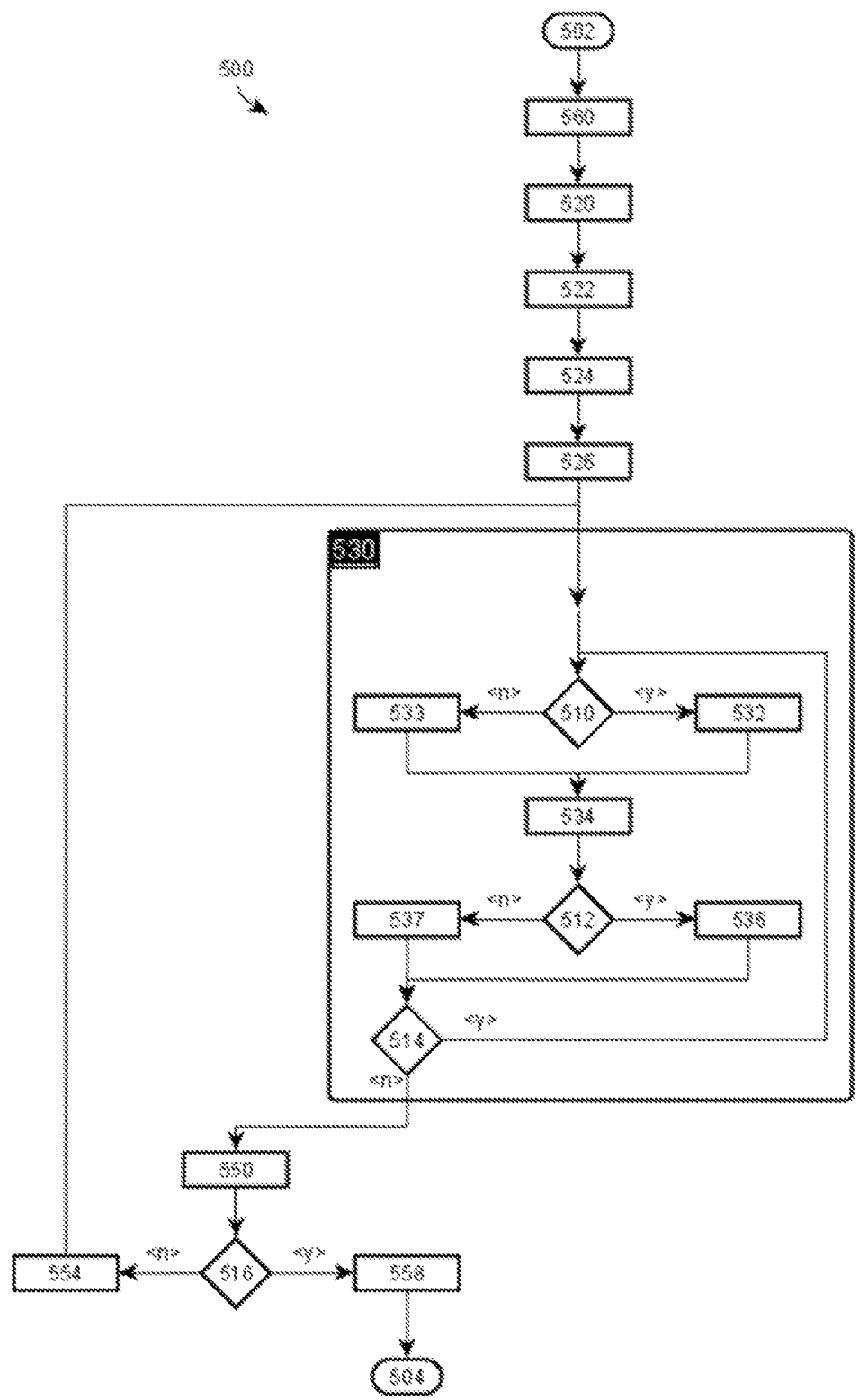
FIG. 5 represents a flowchart of a method for decoding path data according to an embodiment.

FIG. 5 shows a flowchart of a method 500 for decoding path data, the method according to an embodiment of the disclosure.

In an exemplary embodiment the method 500 may comprise method steps 520, 522, 524, 526, 530, 532, 533, 534,

536, 537, 550, 554, 558, and/or 560, as well as method conditions 510, 512, 514, and/or 516. The method 500 starts at the start of the method 502 and ends at the end of the method 504. Furthermore, one or more of the method steps, e.g., a sequence of method steps and/or the whole method 500, may repeatedly be performed. In some implementations, the method may be performed by a navigation apparatus according to an embodiment of the disclosure. Moreover, in some implementations, the first navigation apparatus 210 and/or the second navigation apparatus 220 may be adapted to perform the method 500.

In step 560, a navigation database for storing topological information of a road network may be provided. The navigation database may comprise a plurality of road links and a plurality of link nodes. Each road link may have a start point, an end point, a direction of traffic flow (e.g., backward or forward), a functional road class, and a transportation type. Each link node may define a topological connection between respective start points or end points of two or more of the road links. Furthermore, each link node may define an order of the two or more connected road links. In some implementations, the navigation database may be loaded from a storage device of a navigation apparatus performing method 500. For example, navigation apparatus 210 may load navigation database 216 by means of the data processing apparatus 214.

In step 520, a point-to-point connection to a navigation server such as the navigation server 100 may be established.

In step 522, an identifier of the navigation database may be transmitted to the navigation server via the point-to-point connection.

In step 524, path data indicative of a path within the road network and comprising a start identifier, an end identifier, a link count, and a list of exit numbers may be received from the navigation server via the point-to-point connection.

In step 526, a road link of the plurality of the road links may be selected as a start road link of the path from the navigation database, wherein the start road link is retrieved from the navigation database by the start identifier. Furthermore, the start road link may be added to the path. In some implementations, the start identifier—and correspondingly further identifiers of road links—may include a memory address of the respective road link within the navigation database. In some implementations, such an identifier may be a unique identifier within the navigation database.

In step 530, the path may be iteratively expanded, wherein step 530 may comprise the steps 532, 533, 534, 536, and/or 537 as well as the method conditions 510, 512, and/or 514. The iterating may start with the start road link as a selected road link.

At method condition 510, the selected road link may be determined as having a forward direction of traffic flow. If this is the case—symbolized by <y>—step 532 is performed. Otherwise—symbolized by <n>—step 533 is performed.

In step 532, a link node of the plurality of link nodes may be determined, e.g., by looking up in the navigation database the link node which defines the topological connection with regard to the end point of the selected road link.

Correspondingly, in step 533, a link node of the plurality of link nodes may be determined, e.g., by looking up in the navigation database the link node which defines the topological connection with regard to the start point of the selected road link.

After step 532 or step 533, step 534 may be performed. In step 534, successor road links of the selected road link may be determined by looking up, in the navigation database, all road links that are connected to the selected road link by the link node, which has been determined in one of the steps 532 or 533. Furthermore, in some implementations, such road links that additionally have the same functional road class and transportation type as of the selected road link and have an outgoing traffic flow with regard to the link node may be looked up. Hence, in some implementations, the successor road links may be filtered by the functional road class and the transportation type, and depending on whether they have outgoing traffic flow, the number of possible successor road links may be reduced such that the efficiency of the decoding may be enhanced and the required amount of data for transferring the path data may be reduced.

At method condition 512, it may be determined whether the number of successor road links is two or more. If this is the case—symbolized by <y>—step 536 is performed. Otherwise—symbolized by <n>—step 537 is performed.

In step 536, a next element may be retrieved from the list of exit numbers, e.g., the first element of the list of exit numbers that has not been previously retrieved from the list may be retrieved as the next element. Based on the next element, the road link may be selected from the successor road links for the next iteration, wherein the successor road links are ordered according to the order defined by the link node, which has been determined in one of the steps 532 or 533, and wherein the (newly) selected road link is at the position equal to the next element of the list of exit numbers. The path may be expanded by appending the (newly) selected road link to the path.

In step 537, as a number of successor road links is one, this exactly one successor road link may be selected for the next iteration. The path may be expanded by appending the (newly) selected road link to the path.

At method condition 514, it may be determined whether the number of road links of the path is a smaller than the link count. If this is the case—symbolized by <y>—a further iteration starting at method condition 510 is performed. Otherwise—symbolized by <n>—step 550 is performed.

In step 550, the selected road link, e.g., the road link added last to the path, may be determined as an end road link.

At method condition 516, it may be determined whether the end road link matches with the end identifier. If this is the case—symbolized by <y>—step 558 is performed. Otherwise—symbolized by <n>—step 554 is performed.

In step 554, an error signal may be transmitted, via the point-to-point connection, to the navigation server. Additionally or alternatively, an error message may be displayed by a user interface such as a touchscreen. Moreover, additionally or alternatively, method step 530 may be repeated, wherein the iterating starts with an end road link that is determined by the end identifier, and wherein, instead of step 532, step 533 is performed, and vice versa, whereby, e.g., the path may be expanded backwards. Moreover, for such implementations incorporating expanding the path backwards, successor road links might not be filtered by incoming or outgoing traffic flow, because—otherwise—the respective exit number (for the forward direction) may not reflect a corresponding exit number for the backward direction (e.g., in forward direction those road links with incoming traffic flow may not have been regarded, yet one of them may be used for expanding backwards). Moreover, for such implementations, the exit numbers may beneficially be defined relative to the position of the selected road link within the order, wherein for backward expanding a value with opposite sign is used as corresponding exit number.

In step 558, the path and a part of the map within which the path extends may be provided to a user. For example, the path or a part thereof may be displayed by the touchscreen 218 of the navigation apparatus 210.

Additionally—and, e.g., after method condition 516, but before step 558—if the path data is indicative of two or more sub-paths, wherein the previous steps have been performed for the first sub-path, method 500 may be repeated for a further sub-path—e.g., a second sub-path, a third sub-path, and so on.

In the following, further details, e.g., of further implementations of embodiments according to the disclosure, are provided in conjunction with FIGS. 6 to 18.

A link-based location referencing method is provided, which allows a robust and size-efficient description of any road location in the road network. This method can be used to put any kind of information (e.g., traffic information, routes, parking spots, and so on) on any road available in the head unit of a car navigation system. At least within the section of the present disclosure giving further details in conjunction with FIGS. 6 to 18 a "road location" may refer to a path section as well as a path location. Moreover, a "location reference" may refer to path data.

At least within the section of the present disclosure giving further details in conjunction with FIGS. 6 to 18 the following definitions may apply. A junction is a node—e.g., a link node—in the road network with which more than two links—e.g., road links—are associated. (Here, 'associated' means that the road link is topologically connected to the junction, including transportation links and ignoring possible restrictions of driving direction.) A decision point (DP) (with respect to an incoming road link at a junction) is a junction at which at least two road links different from an incoming road link and of the same FRC (functional road class) as the incoming road link are leaving the junction. (Here, the "incoming road link" stands for the road link through which a path can enter the junction, which needs to be legally drivable in direction pointing to the junction. The "different road links leaving the junction" are road links through which a path can exit the junction, which need to be legally drivable in direction pointing out of the junction. Consequently, every decision point is a node of the road network with which at least three links of same FRC are associated, at least one of them being legally drivable in direction to the junction, at least two other ones being legally drivable in direction out of the junction.)

It is to be understood that the identification of a decision point is path-depended, so a node can be a decision point if entering via A but not be a decision point if entering via B.

In some implementations, a Link Count (LC) is a number of links along a path.

For some implementations, an exit number (EN) is the index of an outgoing link at a junction, which is a decision point for at least one incoming road link. The order is defined by its physical storage in the NDS database. The exit number is calculated per FRC only considering legally drivable roads (e.g., all transportation links and those road links, for which driving in direction out of the junction is not allowed, are not counted). Starting from 0 for the first exit for each FRC the value is increased with every new exit of same FRC. In case there are EN (exit number) greater than 15 the path may end.

Exit numbers may be provided as a list, e.g., as an array for all required decision points of a path.

It is to be understood that the definition of the exit number of a road link is not path-dependent, but it is a property unambiguously defined by the structure and attribution of the road network—e.g., the exit number of a road link is predetermined by the order of the road links connected at a link node.

It is to be understood that exit number might not be explicitly defined if it and all following exit numbers would describe a decision point which are left at the first possible choice (exit number (EN) equal to 0). In other words it is optional to include '0' values for EN's at the end of the path, and, to save bandwidth when transporting LLR-data to the HU (head unit), providers are encouraged to omit this optional data.

In some implementations, a path is a collection of LC number of directed links passing one or more junctions, and a number of DPs within one update region.

A key idea is to define a location reference by an explicit start link—e.g., by a start identifier—and an easy, unambiguous and straightforward expansion model allowing both size efficient encoding and time efficient reconstruction.

Moreover, due to this defining of a location reference, a navigation database may be transformed—e.g., abstracted into—a so-called Location Reference Dictionary (LRD), which may define the topological information about the road network. It is necessary only if there is no access to an NDS DB (Navigation-Data-Standard DataBase, see e.g. https://en.wikipedia.org/wiki/Navigation_Data_Standard) available or if just the information needed for referencing is requested. It allows any content provider to match its road network representation to the road network that is used in the on board navigation system. As a result, the content provider will send location information in the form of a start link and a description of the linear expansion of this link.

For simplifying the data structure of the path data, the following rules may be employed. A path is limited to one FRC only. This reduces the number of possible successors in a junction very often to only 1. Transportation links (such as ferry and car train—e.g., road links that are not segments of a road) must always be described by a single crossing free section, no successor, no predecessor. Ferry terminals are famous examples for multiple successors in one crossing. If we prohibit that relation we need to consider only a very limited number of possible successors. A path must not contain a U-turn (not maneuver but choosing the same link in opposite direction). This makes the decision for an FRC matching successor unique in most junctions (otherwise the U-turn would always be the second possible choice in a none-one-way street). If a path contains a road link with no allowed driving direction (e.g., a footpath), then it may consist of one junction-free sequence of road links with no allowed driving direction. Otherwise, it may follow an allowed driving direction of each contained link.

Moreover, the following additional rules may be employed. Along a path, a DP is left at the link, which is identified by EN. Along a path, a junction which is not a DP, is left at the link with same FRC as the start link has.

Figure 6:
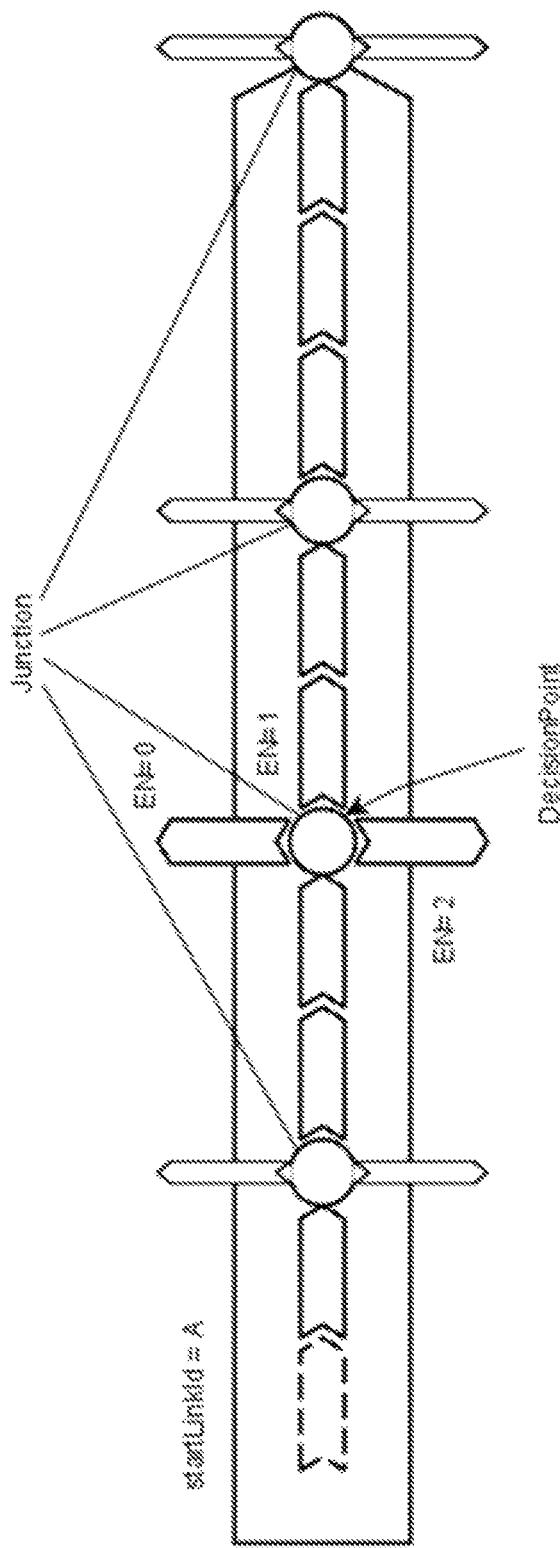
FIGS. 6 to 18 illustrate various examples of paths and/or corresponding path data according to embodiments.

FIG. 6 illustrates an example of a path and a path section, wherein the path section covers the whole path.

The path and path section of FIG. 6 may be decoded based on the following definitions and rules. A path may be an ordered sequence of sub-paths, where each sub-path is a linear link sequence of continued FRC as described above. Here, subsequent sub-paths may be, but need not be, connected via a node of the road network. In some implementations, the link count may be counted separately for each sub-path. Alternatively, in other implementations, the link count may be counted for the whole path, wherein correspondingly, when counting/referencing/indexing road links of the path, the whole path may be considered (e.g., the road links may be counted from the start road link of the first sub-path). A link index may be associated with each link of each path, starting with index 0 at the start link of the path. Analogously to the link count, the link index may be counted separately per sub-path (if the location consists of more than one sub-path).

A precise location information may include a collection of a link index and metric offset describing the start point of a location, and a link index and metric offset describing the end point of a location. Precise start and/or end information, if available, may be given per sub-path, e.g., if a location reference consists of more than one sub-path, precise start and end information may be associated with different paths. So there can be multiple occurrences of precise start/end information within a location reference—once per sub-path—thus representing multiple (not necessarily interconnected) location sections.

In some implementations, the metric start/end offsets may go beyond the next/current link (although combining metric offset with link index may minimize the distance to be spanned by metric offset values, which may avoid performance and rounding issues on head unit side).

In some implementations, if the provider wants a location to start or end exactly at path begin/end or at a junction, metric offsets might not be used, but link indices may be used; otherwise, a head unit might not guarantee to end a metric offset exactly (if that was the intention of the provider).

In some implementations, a link location reference (LLR) consists of a path (e.g., a sequence of sub-paths) and optionally one or more precise location information, and/or of some textual description of the location. If no precise location information is provided, the location may cover the complete sequence of sub-paths—e.g., as illustrated by FIG. 6. If precise location information is provided, the location may merely cover the part(s) of the complete sequence of sub-paths which are specified by the precise location information.

Figure 7:
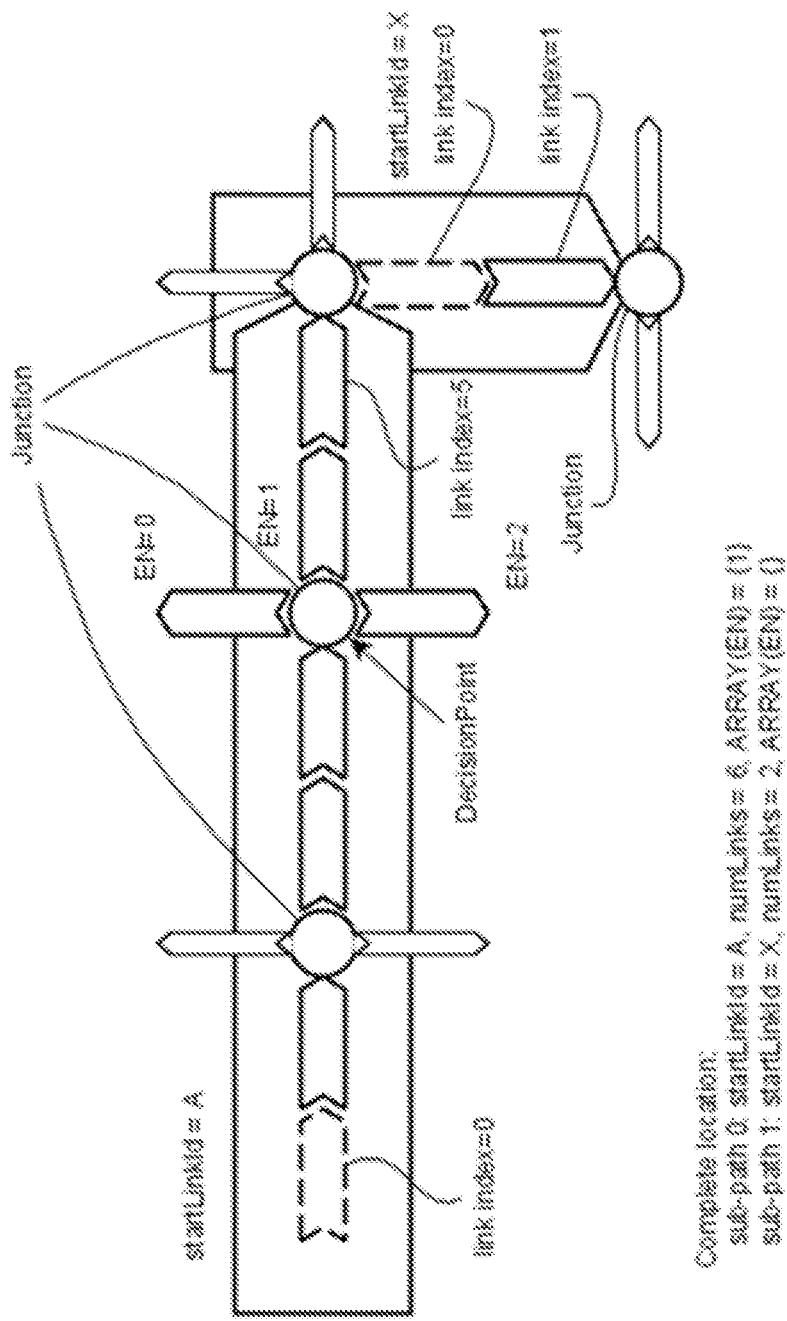

FIG. 7 illustrates an example of a path with two sub-paths, wherein the road links of a first one of the sub-paths may have a functional road class that is different from the functional road class of the road links of a second one of the sub-paths. Moreover, when the underlying path data is used to represent a location, this location—e.g., the path section—may extend over the whole path.

In FIGS. 8 to 17, examples of precise locations—e.g., path sections or path locations—based on precise location information are shown.

As not all locations start exactly at the beginning of the path or end at the end of the path, a method describing more precisely a location with an exact position (offset) and if necessary with a certain length is required. As an example from a traffic application, for so-called "Local Hazard Warning" messages (like "oil on road", "objects on the road", "broken down unlit vehicle", and so on), the driver may expect to get information about the exact position on the road and the exact distance to the current car position. This precise and link-digitization-independent description of start and end point of a location may be defined by the precise location information.

The precise location information may consist of start and/or end information. Start/end information may consist of a link index (addressing the link where the location starts/ends) and/or a metric offset (if the start/end is not exactly located at a link start/end point). The start link index may refer to the start point of the indexed link, and the start offset may shift the start point forwards along the path or sub-path. The end link index may refer to the end point of the indexed link, and the end offset may shift the end point backwards along the path or sub-path.

Precise locations with length greater than 0 may be defined with the following attributes. isPoint may be set to False, to indicate the length greater than 0 case. If the precise location does not begin at the start of the path: linkIdxStart may be used if the precise location doesn't start within the first link of the path; and offsetStart may be used if the precise location does not start exactly at a link start point. If the precise location does not end at the end of the path: linkIdxEnd may be used if the precise location doesn't end within the last link of the path; and offsetEnd may be used if the precise location does not end exactly at a link end point.

Precise locations with 0 length may be reported with the following attributes. isPoint may be set to True, to indicate the length equal to 0 case. linkIdxStart may be used if the point is not located within the first link of the path. offsetStart may be used if the point is not located exactly at a link start point. linkIdxEnd and offsetEnd might not be used for point locations.

Hence, one may summarize that, for defining a precise location with a length bigger than zero, all four attributes linkIdxStart, offsetStart, linkIdxEnd, offsetEnd are optional and can be used independently from each other so describe the offsets on both ends of a precise location.

For defining a precise location as a single path location, e.g., with a length equal to zero, the flag isPoint may be set explicitly to True describe the extent equal to 0 case.

In principle a link location reference with multiple sub-paths might have no limitation with regard to the number of precise location information attributes, or start- or end-offsets, respectively. In fact, each of such sub-paths in a multi sub-path location reference could have its own precise location assigned.

How the location reference is used may depend on the application: e.g., for Traffic Information it may not make sense to have more than one section (defined by start- and/or end-offset), since a Traffic Information is applied to one uninterrupted road stretch.

For encoding of routes, however, it may make sense to have multiple (possibly unconnected) paths, all of them being part of one link location reference.

Figure 8:
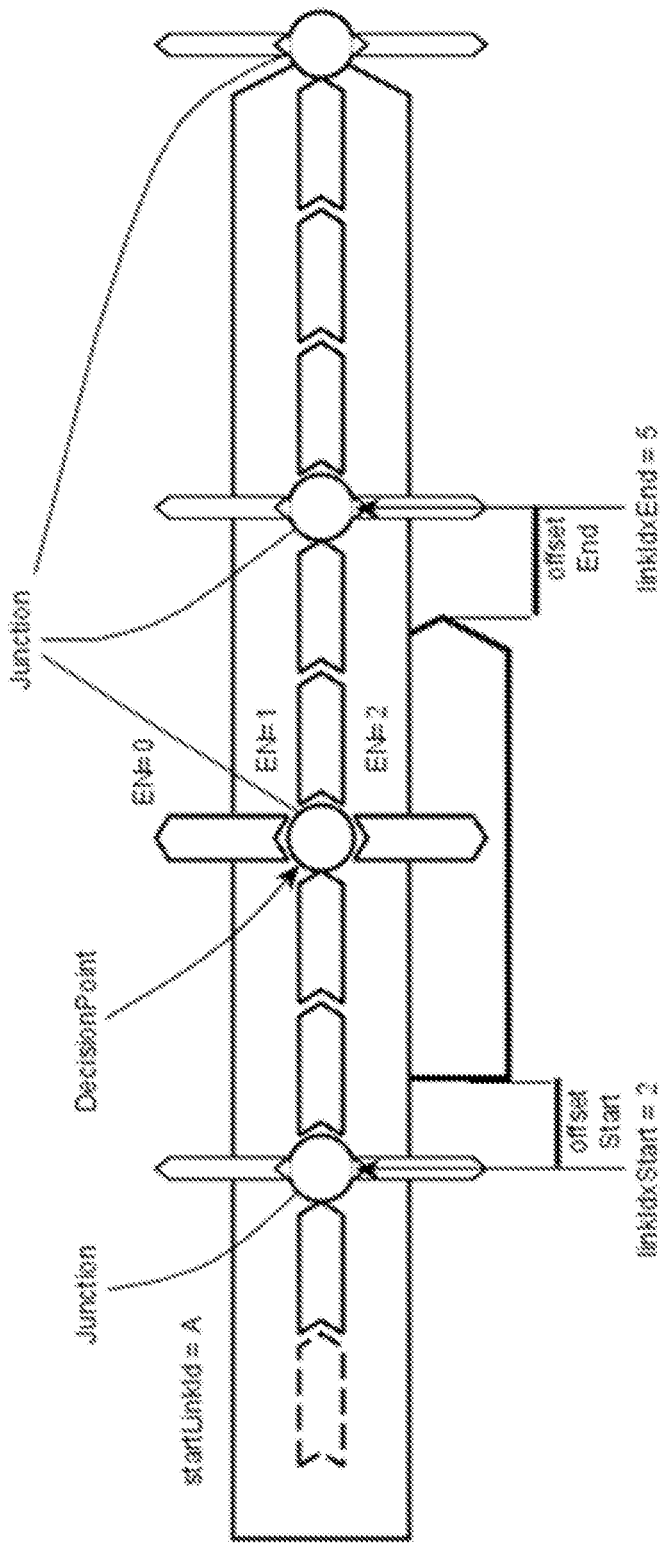

FIG. 8 illustrates an example of a path section, e.g., a location with a length bigger than zero, wherein a metric offset is bigger than zero.

Figure 9:
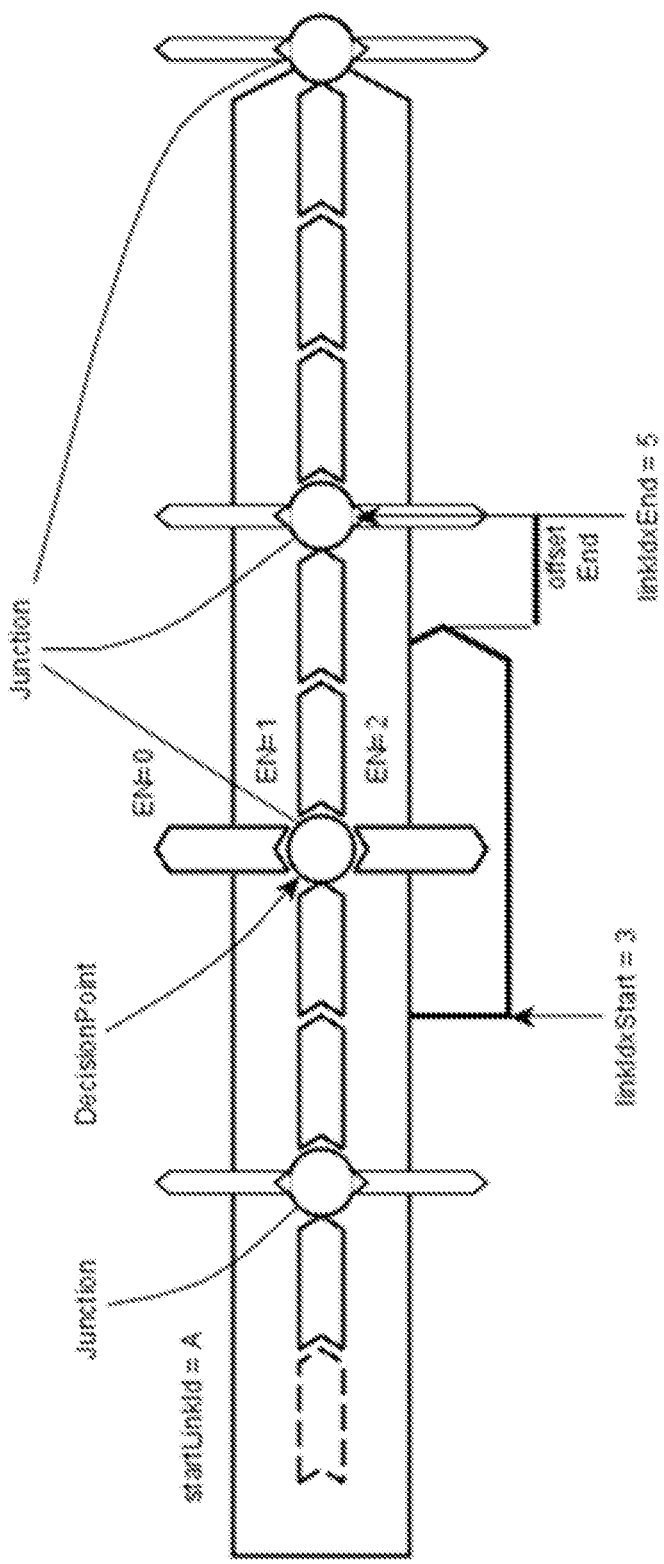

FIG. 9 illustrates an example of a path section with a length bigger than zero, but without a metric offset.

Figure 10:
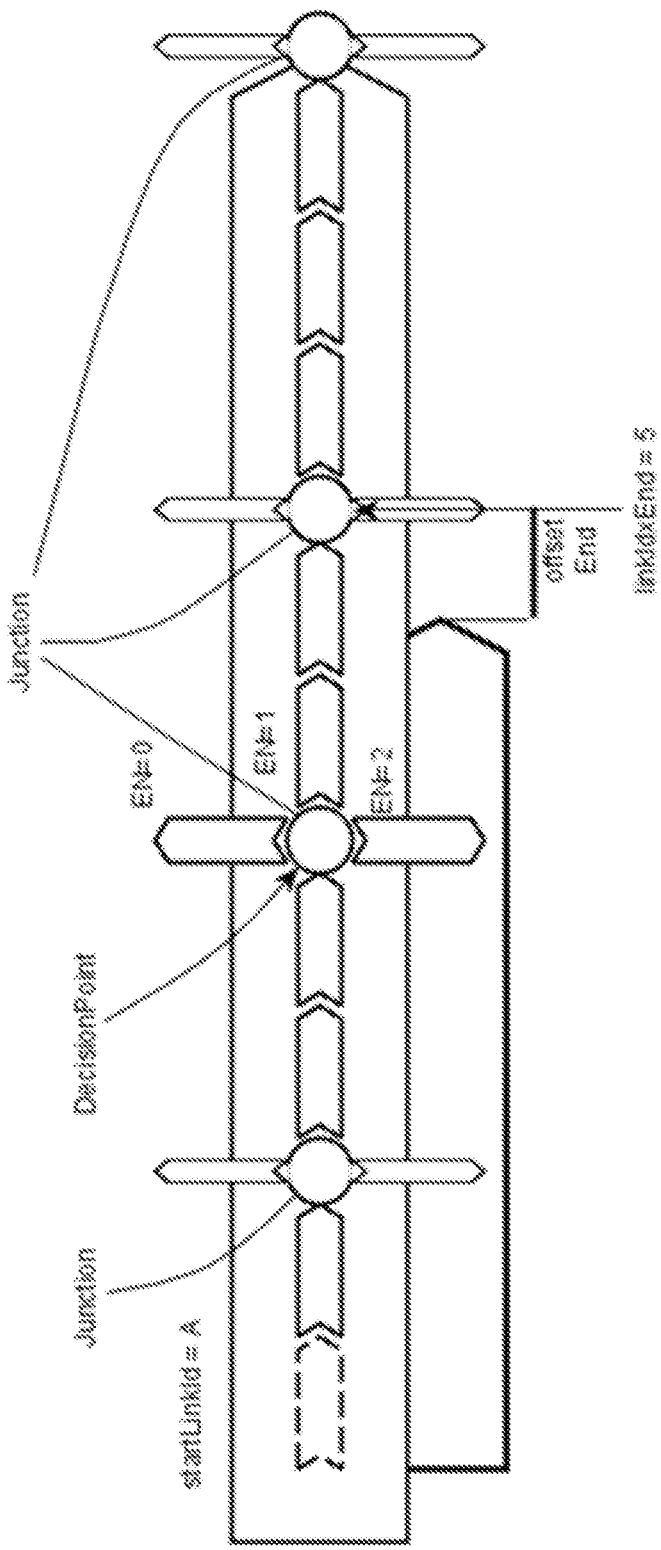

FIG. 10 illustrates yet another example of a path section with a length bigger than zero, but without a metric offset, wherein in this example the path section may start at the beginning of the path, e.g., the start road link of the path is also provided as the section start road link as identified by the startLinkId.

Figure 11:
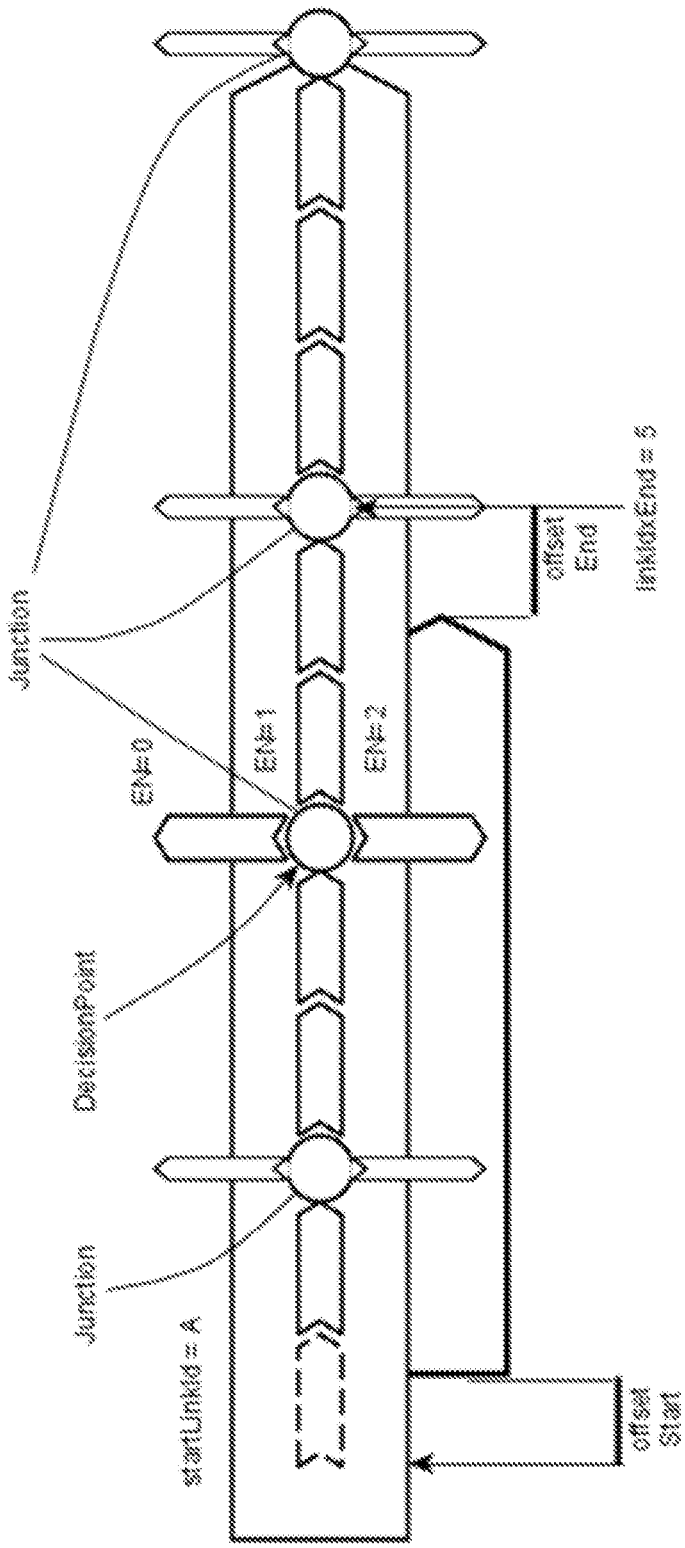

FIG. 11 illustrates a further example of a path section with a metric offset bigger than zero and with a length bigger than zero, wherein in this example the metric offset may be applied from the beginning of the path, because the start road link of the path is also provided as the section start road link as identified by the startLinkId, and no linkIdxStart is provided.

Figure 12:
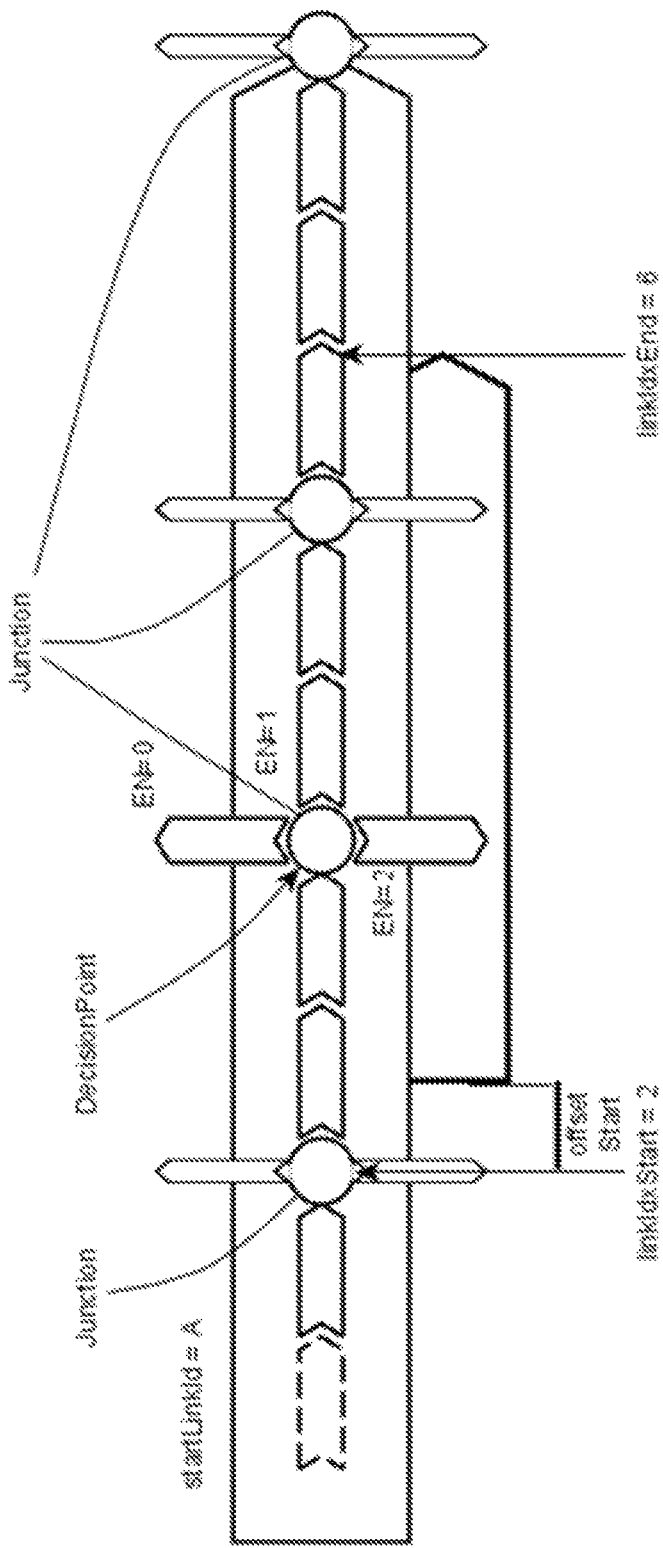

FIG. 12 illustrates a further example of a path section with a metric offset bigger than zero and with a length bigger than zero, wherein in this example no metric end offset is provided.

Figure 13:
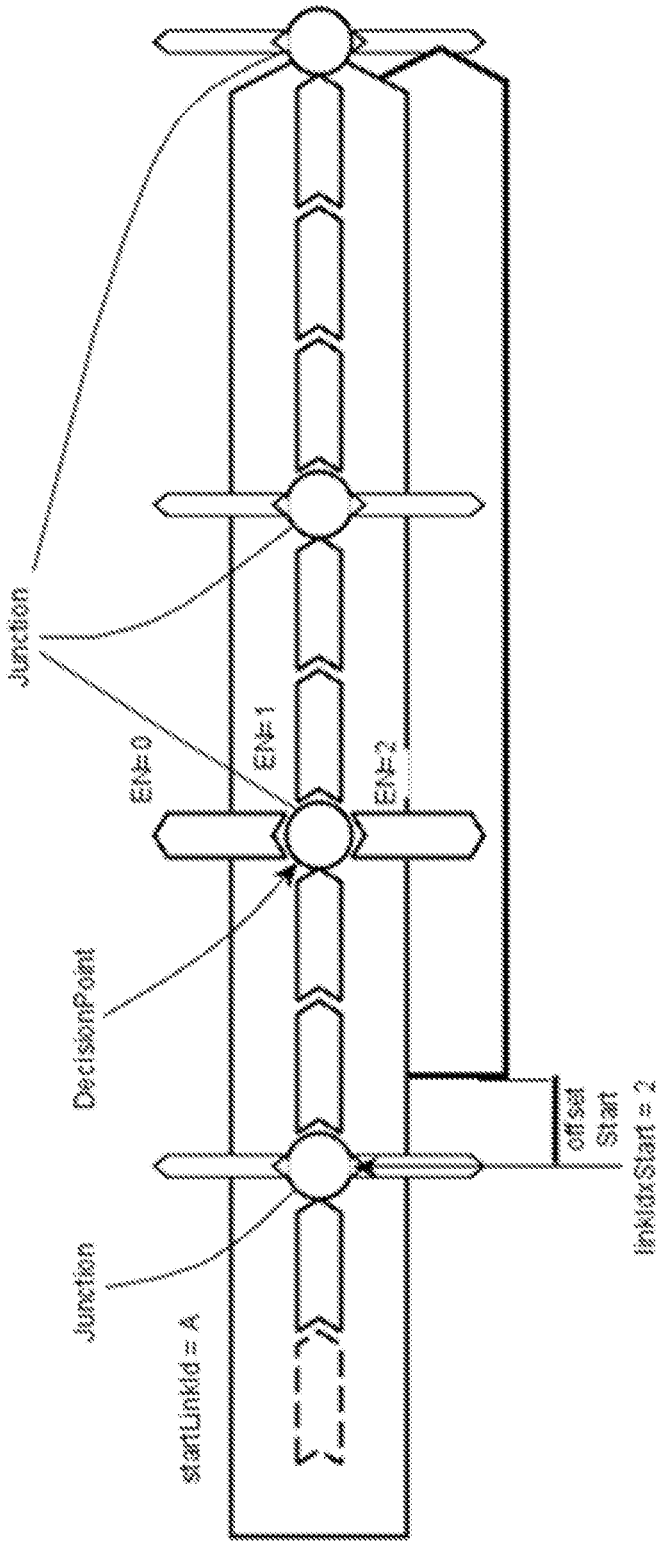

FIG. 13 illustrates a further example of a path section with a metric offset bigger than zero and with a length bigger than zero, wherein the precise location and/or the path section ends with the path.

Figure 14:
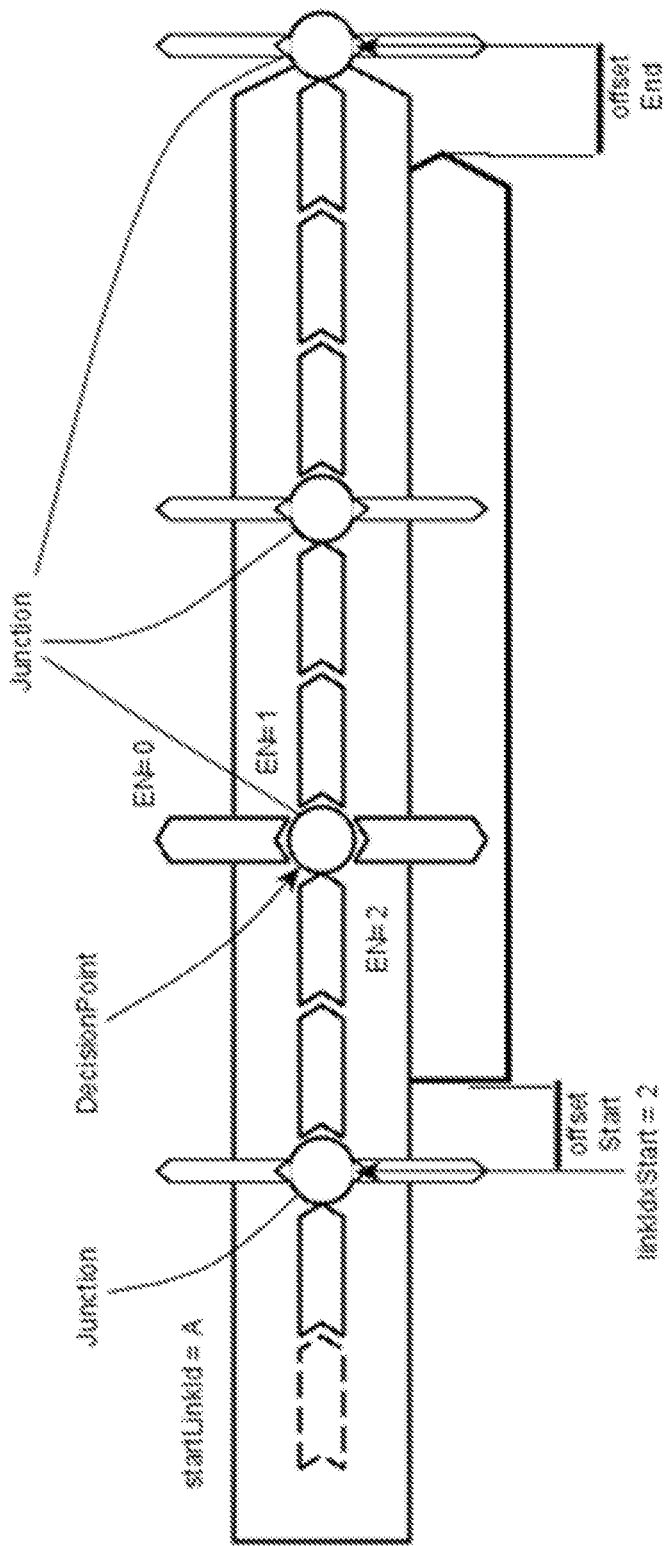

FIG. 14 illustrates a further example of a path section with a metric offset bigger than zero and with a length bigger than zero, which ends within the last link, e.g., the end road link of the path.

Figure 15:
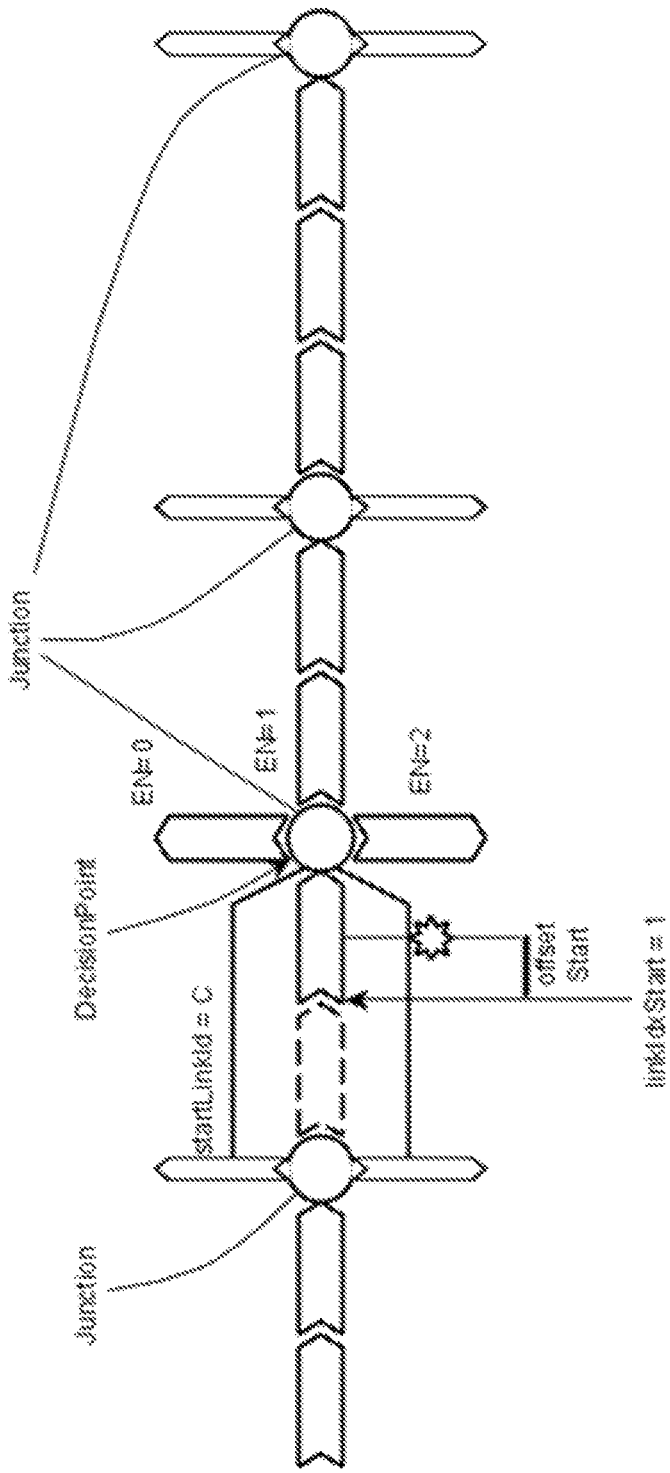

For defining a path location, e.g., a location with a length equal to zero, the flag isPoint may be set to True. For example, FIG. 15 illustrates an example of a path location, wherein, in this example, in addition to isPoint, linkIdxStart and offsetStart are provided 13 e.g., transmitted by the provider and received by the navigation apparatus.

Figure 16:
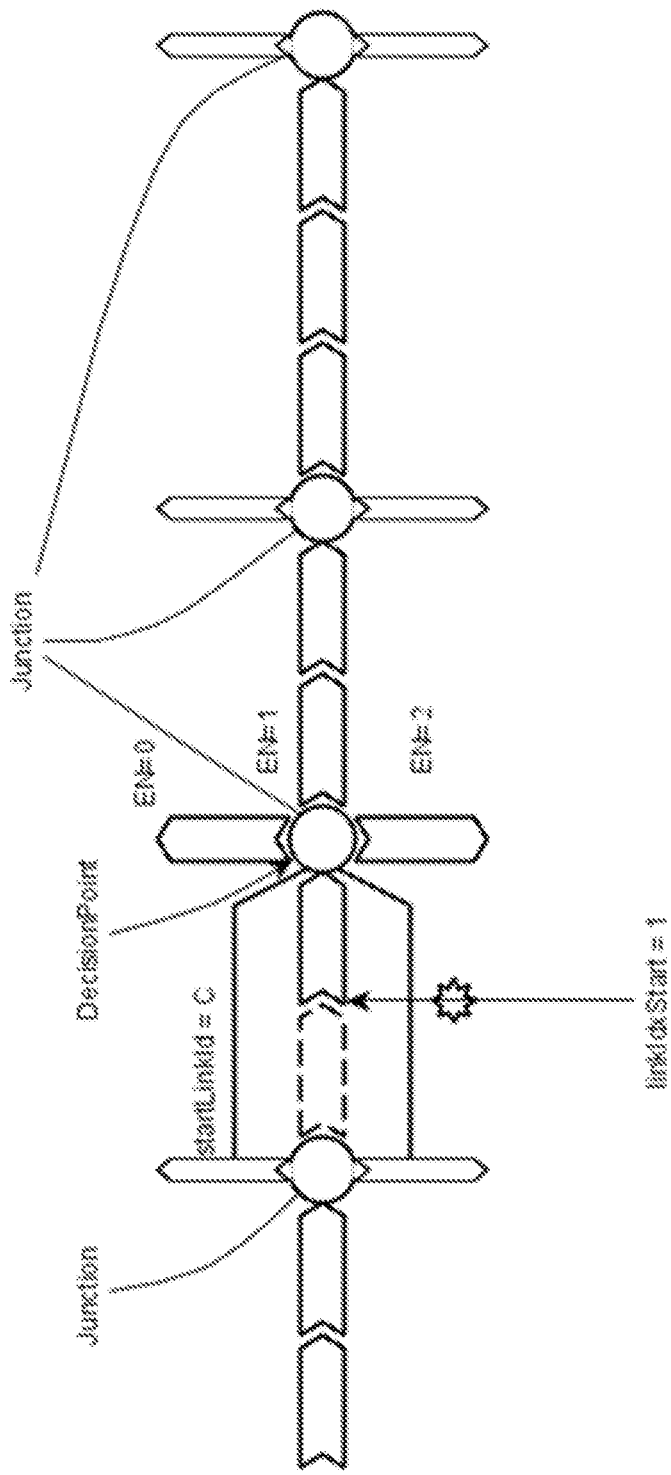

FIG. 16 illustrates a further example of a path location, wherein in this example no metric start offset is provided.

Figure 17:
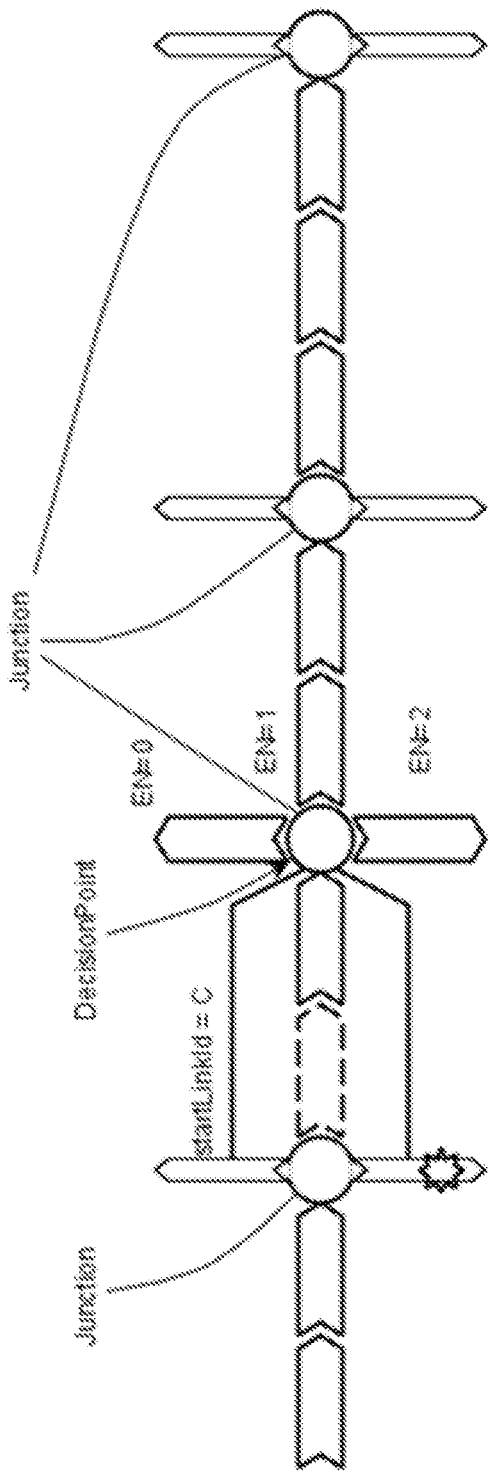

FIG. 17 illustrates yet another example of a path location.

In order to allow efficient caching and reuse on a navigation apparatus such as a head unit, some of the following implementation details or a combination thereof may be beneficial. A provider may use the same location references over and over again and provide detailed position by defining offsets. The provider may follow street names wherever possible to allow easy on board definition of street name. When possible (e.g., for a TPEG service component frame containing traffic messages), it is recommended to sort the LinkPaths (and messages within a service component frame) in such a way that the link metadata and packed tile ID change as rarely as possible. This may allow the encoder to omit a maximum number of optional fields in the encoded locations (as the link metadata and packed tile ID may be taken over from previous LinkPath and previous message within a service component frame), thereby saving bandwidth when transmitting the location data. A maximum path length is likely to be defined based on experience. Distances of 50 to 100 km may be reasonable. U-turns on single digitized roads might not be definable within one LinkPath in this approach, and may instead be modeled by two subsequent connected LinkPaths within one Link Location Reference. Locations following TMC chains may start and end on elements that belong to one or more TMC chains also in a target DB.

In order to provide—e.g., encode and transmit—traffic information with spatial information based on the data structure of the path data, some of the following implementation details, or a combination thereof, may be beneficial.

If the location of a traffic information consists of more than one link path (due to FRC-changes along the location of the traffic information), then all these link paths may be connected (isConnectedToPrevPath equal to True), e.g., no gaps might be allowed within a traffic information message. The reason is that traffic information in TPEG may associated with an uninterrupted location/road stretch, so no 'gaps' might be allowed in the location path.

Embodiments with multi-part messages may be improved by the following implementation.

Two characteristics of TPEG-TFP-messages (Traffic flow information) may be that the amount of messages in the data feed is high, and/or that the location part of each message can be kept static over the update cycles while the flow-information will change from update to update.

Therefore, to save bandwidth for the TFP-part of the TI (Traffic Information) data feed, the usage of Multi Part Message Management as defined in TPEG2-MMC_1.1 can be considered, with update mode 'replaceTopLever', such as an MMC (Message Management Container—TPEG toolkit for message management, defined in TPEG2-MMC). Like this, the LRC of each TFP-message may be sent only once after start-up of the HU, in subsequent messages, only the TFP (flow info) part may be included in the message.

Embodiments which provide—e.g., encode and transmit or, respectively, receive and decode, auditable to a user—names of locations may be improved by one of the following implementations or a combination thereof.

In the TI-Message list (Traffic Information Message list) displayed in the HMI (human-machine-interface) of a HU (head unit), TEC texts (Traffic Event Compact—a TPEG application, for reporting incidents as defined in TPEG2-TEC) and TFP on-route flow (TFP: Traffic Flow And Prediction—a TPEG application, for reporting traffic flow as defined in TPEG2-TFP) may be visible. The majority of TFP messages (off-route) may have no representation in a message list, because it might not makes sense to list each and every flow message in the HMI—the driver would lose the overview.

The proposed priority in the HU for location name processing is as follows. First, take location names from the message if included by the provider. Then, construct/retrieve location names from DB (database) at run-time. Then, if the message is on a TMC-location chain (e.g., useTmcLocsForTexts equal to True), look for TMC-location names. Then, if the message is not on a TMC-location chain, try to create location names from other features of the DB.

Since location text information may be limited in number (only TEC and on-route TFP) and/or may be independent from the concrete location of event, it can be reasonable to cache/persist texts on the HU which were once retrieved from HU-DB.

For list display, some direction information might be expected, like "→München" or "Augsburg→München". The provider can choose to send these in the attributes LocationDescription.fromRoadDirection and LocationDescription.toRoadDirection, and, for the case that only a compass direction like "southbound", or even "citybound", is available for a road, the attribute LocationDescription.compassRoadDirection can be used.

In addition, road number and road name of the location can be sent by the provider—e.g., the navigation server.

In the detailed view of a traffic information, there may be some "between" (road section) information expected, like "from München-Nord to Eching". This can be sent by the provider by using attributes LocationDescription.fromRoadSection and LocationDescription.toRoadSection. In addition, it may be helpful to display the city name in cases of urban locations: normally, non-local drivers cannot locate road names, and so on, without knowing in which city these locations are.

Moreover, since the lookup of TMC-locations based on link information may be a time consuming operation in the HU, a flag may be provided (see useTmcLocsForTexts): If the provider doesn't include any location texts into the TI-message and thus expects the HU to retrieve location texts from the DB, the flag may be set to 'True' if the message is located on a TMC-location chain. In this way, the HU might only perform this time consuming operation if there is a chance to find TMC-locations for that message. As a fallback, the road name itself could be used, maybe enriched with hierarchical information if differing at start and/or end. Once delivered, names might be stored in the HU for one life cycle, or even across several life cycles to prevent sending them all every time. To avoid inconsistencies between location texts from provider and location texts derived from the DB, a head-unit might not derive any location text of a link location reference if location texts are provided in a certain link location reference—in this way, a mixture of DB-derived and provider-delivered texts for one and the same location can be avoided. Also, an assumption may be that if the provider choses to send location texts, then it might be a tricky location for on-the-fly DB-look-up of names, so the head-unit might then fully rely on what was sent by the provider for this location.

For embodiments which transmit path data and potentially further data via a TPEG protocol, one or more of the following implementation details or a combination thereof may be beneficial. With regard to a first implementation detail, the TPEG protocol specifications (e.g., TEC and TFP for sending traffic information) can be used together with LLR without any change required. While there is no particular convention necessary for TEC when using LLR, some restriction may be defined for the usage of TFP with LLR. The method "FlowMatrix" according to the TPEG-TFP protocol might be used, alone. To align the spatial offset definition of the "FlowMatrix"-method with the LLR-method, e.g., to define spatial TFP section offsets which end exactly at the transition from one link to the next link, we need an offset expressed in Link Count, comparable with TMC location hop count. Thus the spatial resolution tfp004: SpatialResolution 000 (see ch. 8.4 tfp004: SpatialResolution, TPEG-TFP-protocol) might be used with LLR. The spatial reference point may be the end of the link path described by this disclosure (see also TPEG-TFP, ch. 6.3: "The end of the LRC location (in driving direction) defines the Spatial Reference Point."). To avoid performance and rounding issues with long absolute metric offsets, it may be beneficial to merely use link counts to cover long distances and to use relative metric offsets to locate the traffic flow precisely for tfp004:SpatialResolution: for example, 000 for "hop count (e.g., TMCLocations, LLR link count)"; or 005 for "relative-10-meterresolution"; or 006 for "relative-100-meterresolution".

In case the locations consist of more than one link path (due to FRC-changes)—e.g., a path comprising several sub-paths—the Link Count reported in FlowVectorSection:: spatialOffset may be applied to all link paths of the location (the Link Counts of all link paths are added up to an overall Link Count of the location).

Moreover, in some implementations, path data being indicative of a path extending through several TPEG tiles may be split up into those tiles, whereby identifiers such as 48 bit identifiers for road links may be shortened (such as to 16 bit for a road link, wherein of this shortened identifier is unique within the respective tile), whereby the amount of required data may be further reduced by, e.g., not repetitively transmitting the remaining 32 bits which are equal within the respective file.

Figure 18:
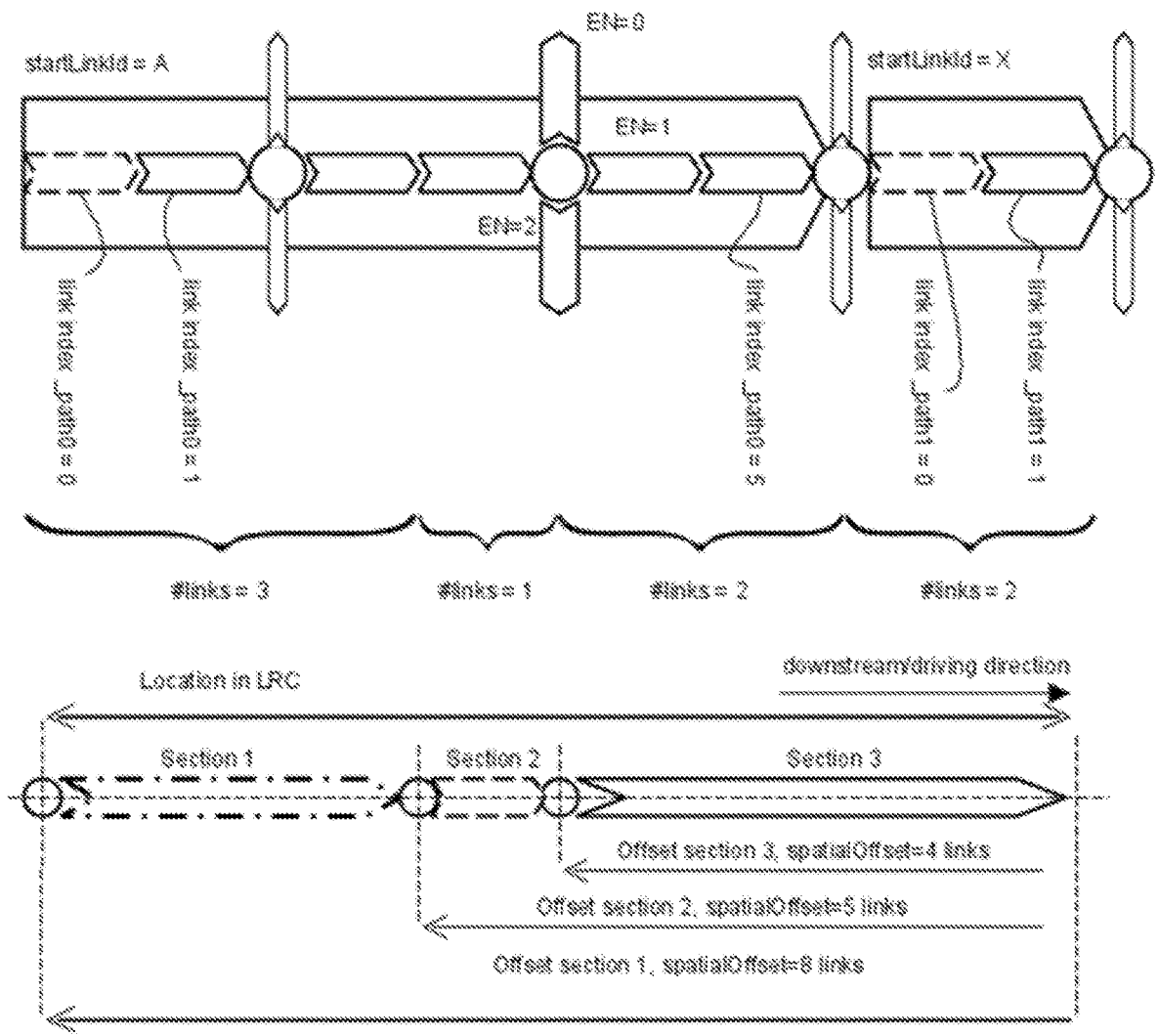

With regard to a second implementation detail, FIG. 18 illustrates an example of a TFP flow vector applied to LLR with 2 (sub-) paths.

In this example, the LLR location consists of 2 paths. The TFP flow vector is, according to the TFP-spec, applied to the overall location. The first path has a length of 6 links, and the second path has a length of 2 links, so the overall length of the location is 8 links. The TFP sections may be applied to these 8 links, wherein the spatialOffset in the TFP-part of the message may be referencing the links of both paths in a way that the links of both paths are added up. The numbering of the link index may start at 0 in the first path, and may be continued in subsequent paths (in this example there might be merely 1 subsequent path).

It is to be understood that the link index (link indexpath0, and so on) shown in the figure may follow the path-internal numbering scheme as described for precise location information, based on the logic that link indices of precise location information as well as link count may be local to each link path. However, to be able to apply the spatialOffset scheme of TFP to the overall LLR location, the links of all paths of a location might be added up.

Moreover, since in the scope of LLR the TFP spatial resolution 000 is used as Link Counts, in some implementations, a TMC location container might not be contained in a TFP-message in parallel to the LLR-container (and sending two containers within one message might undermine the goal of minimizing bandwidth consumption, anyway). PreciseLocationInformation might not be used in conjunction with TFP messages in some implementations, because the precise localization of flow on the road may done by the spatial offset of the TFP-protocol, and not by employing the specification of precise locations as described above in conjunction with PreciseLocationInformation.

For embodiments which provide routing information, such as a navigation server implementing a routing service and a corresponding navigation apparatus, one or more of the following implementation details, or a combination thereof, may be beneficial.

As the link location reference describes a path (which allows FRC-changes within that path), it may also be used to describe a route or a part of a route. Additional information associated with the route, such as, e.g., multiplicity of link location references, calculation parameters, travel time, destination information, and so on, may be further provided. The manner in which such additional information is exchanged together with one or more link location references in order to describe a route may be implemented in various ways.

E.g., if a route (consisting of an ordered sequence of directed road links) is given, the LinkLocationReference (consisting of an ordered sequence of LinkPaths, each of which represents an ordered sequence of directed road links) may be defined as follows: The first LinkPath may start at the first directed road link of the route. As long as no change of update region or change of FRC occurs, this LinkPath may be continued using exit numbers. When a change of update region or FRC occurs, a new LinkPath may be started with the next directed road link (which then is of the new update region or FRC, respectively). Each new LinkPath may have the flag isConnectedToPrevPath set to True, which may indicate that the last directed road link of the last LinkPath and the first directed road link of the new LinkPath are connected.

E.g., if a route with gaps may be described by a LinkLocationReference (e.g., because no full match between a provider DB and the reference layer was possible, and not all subsequent road links of the matched route are connected in the road network), the above described association between route and LinkLocationReference may be extended as follows: after each gap, a new LinkPath is also started with the next directed road link, whereby this LinkPath has the flag isConnectedToPrevPath set to False (e.g., an off-road indicator is provided), which indicates that the last directed road link of the last LinkPath and the first directed road link of the new LinkPath are not connected.

From the above the following conclusions may be drawn.

Within the meaning of the present disclosure, a "road network" may at least refer to a network of roads and/or further transportation means. The roads and further transportation means may be arranged such that one may travel from a departure location within the road network to a destination location within the road network along a path, the path comprising one or more of the roads or connections of further transportation means or parts/sections thereof. Traveling may be by car or other transportation means such as trains, ferries, airplanes, bicycles, or afoot.

Within the meaning of the present disclosure, a "road link" may at least refer to a part of a road network that provides a link between a start point and an end point of the road link. The start point and/or the end point may be connected to further start or end points of further road links at a respective link node of the road network. The link between the start point and the end point may be a road or a road segment within the road network. The link may also be a connection provided by further transportation means such as a connection from a departure point to a destination point of a train, a ferry or an airplane. Moreover, the road link may further comprise one or more shape points between the start point and the end point that are indicative of a shape of the road link.

Within the meaning of the present disclosure, a "path" may at least refer to a linear chain of one or more road links, wherein the first element of the chain is a start road link and the last element of the chain is an end road link. Furthermore, such a path may comprise one or more sub-paths, wherein each sub-path comprises one or more road links, one of the road links being a start road link and/or an end road link of the respective sub-path. Such sub-paths may be ordered, e.g., the path may comprise a first sub-path, a second sub-path, and so on, up to a last sub-path, wherein the start road link of the first sub-path is the start road link of the path and/or wherein the end road link of last sub-path is the end road link of the path. Moreover, adjacent road links of the path or at least of a sub-path may be connected to each other, wherein the end point of the start road link may be connected to the start-point of the road link, which is adjacent next to it (e.g., to the start-point of the second road link), and wherein the end point of this next road link may be connected to the start-point of the road link that is adjacent next to this next road link (e.g., to the start-point of the third road link), and so on. When all adjacent road links of the path or sub-path are connected to each other, the (sub-) path provides a route within the road network and/or one may travel along the path—without leaving the road network—from the start road link to the end road link. Moreover, a sub-path may be connected to its adjacent sub-paths. All sub-paths may be connected, such that a route within the road network is provided. Alternatively, at least one sub-path may be disconnected from an adjacent sub-path, whereby a path including such a sub-path may be indicative of a route or respectively of one or more locations extending along the path that, at least partially, may be leaves of the road network (e.g., may be indicators of an off-road route).

It is to be understood that a road link may further be indicative of a direction of traffic flow, e.g., forward, backward, or both directions; and that while the road links have been described in the previous section as typically providing a link from the start point to the end point, some road links may provide (or may merely provide, depending on the direction of traffic flow) a link from the end point to the start point; and that accordingly, e.g., end points of road links may also be connected to each other at a link node and/or start points of road links may also be connected to each other at a link node. Hence, for some of the road links, the direction of traffic flow may change along the path, while an overall direction of traffic flow along the path from the start road link to the controlling link remains the same. In some implementations the start point and the end point may be selected from the points of a road link based on the direction of digitalization. In some implementations based on the Navigation Data Standard (NDS) the direction of digitalization may be provided by the so-called South-West-Rule, such that the point at the beginning or the end of the road link which is located further into the Southwest-direction is selected as the start point, whereas the other point at the beginning or end is selected as the end point. Accordingly, depending on the actual allowed direction of traffic flow and the selecting of the start and end point, the direction of traffic flow of the road link may be forward or backward for a one-way street or both otherwise.

Within the meaning of the present disclosure, a "navigation server" may refer to a server assembly with one or more communication interfaces such as network interfaces for transmitting data to and receiving data from one or more navigation apparatuses. Such a server assembly may be a single personal computer, a cluster of computers, or a virtualized computer, which may e.g., be implemented within a cloud infrastructure.

Within the meaning of the present disclosure, a "data processing apparatus" may at least refer to a data processor such as a microprocessor or any other means adapted to process data, e.g., digital data.

With regard to the first aspect of the disclosure, the following embodiments, advantageous modifications, and further improvements may be provided.

According to some embodiments, the method further comprises transmitting an identifier of the navigation database to a navigation server. This may facilitate an adaption of the navigation server and/or the path data provided by the navigation server to a navigation apparatus performing the method. In some implementations, the method comprises establishing a point-to-point connection between the navigation server and the navigation apparatus, whereby bidirectional communication may be facilitated such as transmitting, by the navigation apparatus, the identifier to the navigation server or receiving the path data—the path data being adapted for the navigation apparatus—from the navigation server. By adapting the transmitted path data specifically to the navigation database or a navigation apparatus comprising the navigation database, the amount of data for transferring path data indicative of the path may be further reduced, e.g., when compared to other techniques which provide similar detail of spatial information and which are based on a map agnostic encoding. An advantage of the bidirectional communication may be that specific encoding may be provided, even though a multitude of different navigation databases are typically used for different navigation apparatuses, which would render providing—e.g., encoding and transmitting—path data with different encodings at a venture rather difficult and would require transmitting a larger amount of data.

According to some embodiments, the path data is further indicative of an end identifier. The method further comprises determining, when the link count is equal to the number of road links of the path, the selected road link as an end road link and determining whether the end road link matches with the end identifier. Alternatively, the method further comprises determining whether an identifier of the selected road link is equal to the end identifier, when the link count is equal to the number of road links of the path. Moreover, in some implementations in which the path comprises a linear chain of connected road links, the end road link may also be determined by selecting the last element of the chain. This may allow a check of whether the path data has been decoded correctly. In some further implementations, an error signal indicative of a mismatch between the end road link and the end identifier may be provided to a user (e.g., of a navigation apparatus). Alternatively or additionally, the path resulting from the incorrect decoding may be ignored by the method or the navigation apparatus. In some further implementations, the iterations for expanding the path may be started from the end road link, wherein the end road link may be determined/selected based on the end identifier. Thereby, the reliability may be enhanced.

When starting from the start road link—such as for road links having a forward direction of traffic flow, e.g., from the start point to the end point—the determining of whether more than one road link is connected to the selected road link is based on a link node at the end point of the selected road link, and, when selecting one of the road links for the next iteration, a road link whose end point is connected to this link node is selected.

When starting from the end road link—typically and for road links having a forward direction of traffic flow, e.g., from the start point to the end point—the determining of whether more than one road link is connected to the selected road link may be based on a link node at the start point of the selected road link, and when selecting one of the road links, a road link whose start point is connected to this link node may be selected.

In a more general implementation, when at least some road links have a backward direction of traffic flow, for such road links the start point and the end point may be interchanged—e.g., when starting from the start road link a number of road links connected at a link node at which the start point of the selected road link may be connected. Also in a more general implementation, when at least some road links have a direction of traffic flow in both directions—e.g., a two-way street—the start point or the end point may be used for determining the number of connected road links and for selecting the (next) road link for the next iteration depending on whether the (currently) selected road link is connected to the road link, which has been selected in the previous iteration, at the end point or the start point of the (currently) selected road link, respectively.

In some embodiments, determining whether the end road link matches with the end identifier may be combined with transmitting an identifier of the navigation database to a navigation server and/or may be combined with establishing a point-to-point connection with a navigation server, wherein the method may further comprise transmitting an error signal to the navigation server if the end identifier and the end road link do not match. This may synergistically allow a check, at the navigation server, of whether the path data has been correctly transferred and/or has been correctly encoded and decoded for the transmitted identifier of the navigation database. In case of a mismatch, the navigation server may retransmit the path data. Moreover, if retransmitted path data also cannot be correctly decoded, an error message may be written to an error log. Thereby, the reliability of the method, a navigation apparatus performing the method, and/or a system comprising the navigation apparatus and the navigation server may be enhanced, and/or (manually) correcting encoding or decoding errors may be facilitated and may be directed to specific navigation databases (e.g., the navigation database identified by the identifier of the navigation database). Hence, the check of whether the path data has been correctly encoded, transferred, and decoded may provide a means of quality control.

According to some embodiments, the path data may further comprise a list of exit numbers, wherein the list may comprise the at least one exit number. Furthermore, selecting one of the road links, when more than one road link is connected to the selected road link, may be based on a respective next element of the list of exit numbers. This may facilitate encoding a path with more than one road link having two or more road links connected to it at a link node. When encoding such a path for some other implementations, such a path may also be split up into several sub-paths. Moreover, in some implementations, the selecting of the link node when only exactly one link node is connected to the selected link node may also be based on a respective next element of the list of exit numbers. Since the exit numbers might always be the same in such cases—e.g., zero or one depending on the way of counting the exit numbers—such exit numbers may also be omitted from the list in some implementations, whereby the amount of data is further reduced.

According to some embodiments, each of the plurality of road links may be further indicative of a direction of traffic flow. Furthermore, each of the plurality of link nodes may define the topological connection with regard to either the respective start point or the respective end point of each of the two or more road links connected at the respective link node. Furthermore, when determining whether more than one road link is connected to the selected road link, a link node of the plurality of link nodes may be selected that, if the direction of traffic flow of the selected link node is forward, defines the topological connection with regard to the end point of the selected road link; or, if the direction of traffic flow of the selected link node is backward, defines the topological connection with regard to the start point of the selected road link, wherein only such road links are counted whose respective direction of traffic flow is outgoing from the selected link node. Furthermore, when selecting one of the road links connected to the selected road link, a road link may be selected whose position within the order of the two or more connected road links at the selected link node is equal to the at least one exit number, wherein only such road links may be counted within the order whose respective direction of traffic flow is outgoing from the selected link node. By determining the direction of traffic flow and the selecting of the link node for determining the connected road links, the path may be encoded in a more flexible way, and/or for road links with a traffic flow in both directions, and/or for a navigation database which defines respective start and end points independently from the respective direction of traffic flow—e.g., depending on a direction of digitalization. Moreover, an advantage of counting only road links with outgoing traffic flow may be that a number of possible exits is reduced, whereby a number of elements of a list of exit numbers and, hence, the required amount of data may be reduced, and/or whereby an expected highest exit number may be reduced, which may allow the representation of the at least one exit number or exit numbers of the list in a more efficient manner—e.g., with less bits. For example, at a link node a start point of a road link of a current iteration, this road link having a backward direction of traffic flow may be connected to a start point of a first road link and a start point of a second road link, wherein the first road link has a backward direction of traffic flow and the second road link has a forward direction of traffic flow. Then merely the second road link may be regarded and—as it is the only road link—may be selected for the next iteration, because it has an outgoing direction of traffic flow (e.g., leading away from the link node) while the first link node has an ingoing direction of traffic flow (e.g., traffic may flow from the end point of the first road link to the start point of the first road link, and, thus, may flow to the link node).

In some embodiments, in which at least some of the plurality of road links are indicators of a direction of traffic flow, the path data may be further indicative of a direction of traffic flow at a beginning of the path, e.g., at the start road link identified by the start identifier. By indicating the direction of traffic flow, expanding the path in a forward direction or expanding the path in a backward direction may be facilitated.

According to some embodiments, each of the plurality of road links may be further indicative of at least one of a functional road class or a transportation type. Furthermore, when determining whether more than one road link is connected to the selected road link and when selecting one of the road links connected to the selected road link, such road links may be counted that have the same functional road class or transportation type.

Within the meaning of the present disclosure, a "functional road class" may at least refer to a classification of a road link with regard to a quality of a road link. The functional road class may be indicated by a numerical value. For road segments, a segment of an expressway may have a high numerical value, a segment of a country road may have a medium numerical value, and a segment of an urban road may have a low numerical value.

Within the meaning of the present disclosure, a "transportation type" may at least be indicative of the type of transportation between the start and the end point of a road link such as a road for transportation by car, walkway for transportation afoot, train for a train connection, and/or ferry for transportation by a ferry.

By only regarding road links with the same functional road class and/or transportation type, a number of elements of a list of exit numbers and/or an expected highest exit number may be reduced. This may, in some implementations, be synergistically combined with regarding only such road links that have an outgoing direction of traffic flow.

According to some embodiments, the path data may be indicative of a first and a second sub-path of the path and may comprise a respective start identifier, link count, and at least one exit number for each of the first and second sub-path. Furthermore, the selecting of the start road link and iterative expanding of the path may be performed for the first sub-path based on the respective start identifier, link count, and at least one exit number for the first sub-path, until the link count for the first sub-path is equal to the number of road links of the first sub-path. Additionally, the selecting of the start road link and iterative expanding of the path may be performed for the second sub-path based on the respective start identifier, link count, and at least one exit number for the second sub-path, until the link count for the second sub-path is equal to the number of road links of the second sub-path. An advantage of multiple sub-paths may be that a more complex path may be described, whereby spatial information may be provided with increased detail.

In some embodiments, in which the path is split up in multiple sub-paths, e.g., into a first and a second sub-path, an end road link of the road links of the first sub-path may be connected to the start road link of the second sub-path, wherein a functional road class or transportation type of the end road link of the first sub-path and of the start road link of the second sub-path may differ. This may synergistically facilitate reducing the amount of required data by limiting a number of required exit numbers, while enabling transfer of spatial information for a path that crosses different functional road classes or transportation types.

Likewise, by splitting up the path into sub-paths, a path may be encoded, transferred, and decoded that comprises a section outside the road network, e.g., an off-road section.

In some embodiments, in which the path is split up in at least a first and a second sub-path, the path data may be further indicative of an off-road indicator. The method may further comprise determining, at least for the first and second sub-path, whether an end road link of the first sub-path is connected to the start road link of the second sub-path. Moreover, the method may comprise showing a warning message to a user or providing an error signal, if the first and second sub-path are not connected, while the off-road indicator might not indicate an off-road section within the path. This may enhance safety, when using the method for navigation and routing and driving directions.

According to some embodiments, the path data may be further indicative of a path location and may comprise at least one of a location identifier, a location index and a location offset. Furthermore, the method may further comprise decoding the path location. Decoding the path location may comprise selecting as a location road link a road link of the path based on the location identifier or the location index, if indicated by the path data; or, otherwise, the start road link. Decoding the path location may further comprise determining the path location as a location within the path, wherein the location may be at the start point of the location road link if the path data is not indicative of the location offset; or, otherwise, the location may be offset along the path in a direction toward the end point of the location road link, from the start of the location road link, by the location offset.

According to some embodiments, the path data may be further indicative of a path section and may comprise at least one of a section start identifier, a section start index, and a section start offset. Furthermore, the method may further comprise decoding the path section. The decoding of the path section may comprise selecting, as a section start road link, a road link of the path based on the section start identifier or the section start index, if indicated by the path data; or, otherwise, the start road link. The decoding may further comprise determining a start of the path section, wherein the start may be at the start point of the section start road link, if the path data is not indicative of the section start offset; or, otherwise, the start may be offset, along the path in a direction toward the end point of the section start road link, from the start point of the section start road link by the section start offset.

According to some embodiments, the path data may be further indicative of a path section and may comprise at least one of a section end identifier, a section end index, and a section end offset. Furthermore, the method may further comprise decoding the path section. Decoding the path section may comprise selecting, as a section end road link, a road link of the path based on the section end identifier or the section end index, if indicated by the path data; or, otherwise, an end road link with which the path has been expanded at the last iteration. The decoding of the path section may further comprise determining an end of the path section, wherein the end may be at the end point of the section end road link, if the path data is not indicative of the section end offset; or, otherwise, the end may be offset, along the path in a direction toward the start point of the section end road link, from the end of the section end road link by the section end offset.

By the path location or the path section navigation information may be provided with increased spatial precision. An advantage of providing the location, start and/or end index may be that rounding errors and computational errors of a calculation of a distance from the section start link/section end link/location link may be reduced compared to specifying a path section or location based on solely a (potentially larger) offset. Likewise, by the location, start and/or end identifier, the precision of the spatial information may be further increased due to reduction of rounding and computational errors. In order to (re-) use the path for several levels of resolution of the road network, the path section or location may be encoded for each respective level and then decoded based on a location, start and/or end identifier for a road link that is present at the respective level, whereby computational and data efficiency may be further enhanced.

In some embodiments for several levels of resolution of the road network, the path location or path section being based on at least one of the indices and/or at least one of the identifiers may be combined with limiting a number of possible road links for the next iteration by direction of traffic flow, functional road class or transportation type, wherein each of the plurality of road links may be further indicative of at least one level of resolution, and wherein furthermore only such road links may be regarded, when determining and selecting one of the road links connected to the selected road, whose at least one level of detail matches with a predetermined level of detail.

With regard to the second aspect of the disclosure, the following embodiments, advantageous modifications, and further improvements may be provided.

According to some embodiments, the method may further comprise transmitting, to a navigation apparatus, path data comprising the start identifier, the link count, and the at least one exit number.

According to some embodiments, the method may further comprise providing a further database for storing topological information of a road network. Furthermore, the method may comprise receiving an identifier for a navigation database from a navigation apparatus and determining whether the identifier for the database matches with the at least one database or with the further database. Moreover, the determining of the start identifier, the link count, and the at least one exit number may be based on the further database and an identifier path for the further database, if the identifier for the database matches with the further database. This may facilitate determining path data comprising the start identifier, the link count, and the at least one exit number specifically for the navigation database of the navigation apparatus.

The invention claimed is:

1. A computer-implemented method for decoding path data, the method comprising:
   providing a navigation database for storing topological information of a road network, the navigation database comprising a plurality of road links, each road link having a start point and an end point, and a plurality of link nodes, each link node defining a topological connection between two or more of the road links and an order of the two or more connected road links;
   receiving path data indicative of a path within the road network and comprising a start identifier, a link count, and at least one exit number;
   selecting, from the navigation database, one road link of the plurality of the road links as a start road link of the path based on the start identifier; and
   iteratively expanding the path with selected road links until the link count is equal to the number of road links of the path, wherein an iteration of the expanding comprises:
      determining whether more than one road link of the plurality of road links is connected to the selected road link based on the plurality of link nodes;
      selecting one of the road links connected to the selected road link based on the at least one exit number and the order of connected road links, if more than one road link is connected to the selected road link; and
      selecting, if exactly one road link is connected to the selected road link, the exactly one connected road link,
   wherein each of the plurality of road links is further indicative of at least one of a functional road class or a transportation type; and wherein, when determining whether more than one road link is connected to the selected road link and when selecting one of the road links connected to the selected road link, only such road links are counted that have the same functional road class or transportation type.

2. The method of claim 1, further comprising:
   transmitting an identifier of the navigation database to a navigation server.

3. The method of claim 2, wherein the path data is further indicative of an end identifier, the method further comprising:
   determining, when the link count is equal to the number of road links of the path, that the selected road link is an end road link;
   determining whether the end road link matches with the end identifier; and
   transmitting an error signal to the navigation server, if the end identifier and the end road link do not match.

4. The method of claim 1, wherein the path data further comprises a list of exit numbers, the list comprising the at least one exit number; and wherein selecting one of the road links, when more than one road link is connected to the selected road link, is based on a respective next element of the list of exit numbers.

5. The method of claim 1, wherein:
   each of the plurality of road links is further indicative of a direction of traffic flow;
   each of the plurality of link nodes defines the topological connection with regard to either the respective start point or the respective end point of each of the two or more road links connected at the respective link node;
   when determining whether more than one road link is connected to the selected road link, a link node of the plurality of link nodes is selected that, if the direction of traffic flow of the selected link node is forward, defines the topological connection with regard to the end point of the selected road link, or, if the direction of traffic flow of the selected link node is backward, defines the topological connection with regard to the start point of the selected road link, wherein only such road links are counted whose respective direction of traffic flow is outgoing from the selected link node; and
   when selecting one of the road links connected to the selected road link, a road link is selected whose position within the order of the two or more connected road links at the selected link node is equal to the at least one exit number, wherein only such road links are counted within the order whose respective direction of traffic flow is outgoing from the selected link node.

6. The method of claim 1, wherein:
   the path data is indicative of a first sub-path of the path and a second sub-path of the path, and comprises a respective start identifier, link count, and at least one exit number for each of the first sub-path and the second sub-path;

the selecting of the start road link and iterative expanding of the path is performed for the first sub-path based on the respective start identifier, link count, and at least one exit number for the first sub-path, until the link count for the first sub-path is equal to the number of road links of the first sub-path; and the selecting of the start road link and iterative expanding of the path is performed for the second sub-path based on the respective start identifier, link count, and at least one exit number for the second sub-path, until the link count for the second sub-path is equal to the number of road links of the second sub-path.

7. The method of claim 1, wherein the path data is further indicative of a path location and comprises at least one of a location identifier, a location index, and a location offset; and wherein the path location is decoded by:

selecting as a location road link a road link of the path based on the location identifier or the location index, if indicated by the path data, or, otherwise, the start road link; and determining the path location as a location within the path, wherein the location is at the start point of the location road link, if the path data is not indicative of the location offset, or, otherwise, the location is offset, along the path into a direction to the end point of the location road link, from the start of the location road link by the location offset.

8. The method of claim 1, wherein the path data is further indicative of a path section and comprises at least one of a section start identifier, a section start index, and a section start offset; and wherein the path section is decoded by:

selecting, as a section start road link, a road link of the path based on the section start identifier or the section start index, if indicated by the path data, or, otherwise, the start road link; and determining a start of the path section, wherein the start is at the start point of the section start road link, if the path data is not indicative of the section start offset, or, otherwise, the start is offset, along the path into a direction to the end point of the section start road link, from the start point of the section start road link by the section start offset.

9. The method of claim 1, wherein the path data is further indicative of a path section and comprises at least one of a section end identifier, a section end index, and a section end offset; and wherein the path section is decoded by:

selecting, as a section end road link, a road link of the path based on the section end identifier or the section end index, if indicated by the path data, or, otherwise, an end road link with which the path has been expanded at the last iteration; and determining an end of the path section, wherein the end is at the end point of the section end road link, if the path data is not indicative of the section end offset, or, otherwise, the end is offset, along the path into a direction to the start point of the section end road link, from the end of the section end road link by the section end offset.

10. A navigation apparatus comprising a data processing apparatus and being operable to perform, controlled by the data processing apparatus:

providing a navigation database for storing topological information of a road network, the navigation database comprising a plurality of road links, each road link having a start point and an end point, and a plurality of link nodes, each link node defining a topological connection between two or more of the road links and an order of the two or more connected road links;

receiving path data indicative of a path within the road network and comprising a start identifier, a link count, and at least one exit number;

selecting, from the navigation database, one road link of the plurality of the road links as a start road link of the path based on the start identifier; and iteratively expanding the path with selected road links until the link count is equal to the number of road links of the path, wherein an iteration of the expanding comprises:

determining whether more than one road link of the plurality of road links is connected to the selected road link based on the plurality of link nodes;

selecting one of the road links connected to the selected road link based on the at least one exit number and the order of connected road links, if more than one road link is connected to the selected road link; and selecting, if exactly one road link is connected to the selected road link, the exactly one connected road link, wherein each of the plurality of road links is further indicative of at least one of a functional road class or a transportation type; and wherein, when determining whether more than one road link is connected to the selected road link and when selecting one of the road links connected to the selected road link, only such road links are counted that have the same functional road class or transportation type.

11. The navigation server of claim 10, further being operable to perform:

transmitting an identifier of the navigation database to a navigation server.

12. The navigation server of claim 11, wherein the path data is further indicative of an end identifier, the navigation server further being operable to perform:

determining, when the link count is equal to the number of road links of the path, that the selected road link is an end road link;

determining whether the end road link matches with the end identifier; and transmitting an error signal to the navigation server, if the end identifier and the end road link do not match.

13. The navigation server of claim 10, wherein the path data further comprises a list of exit numbers, the list comprising the at least one exit number; and wherein selecting one of the road links, when more than one road link is connected to the selected road link, is based on a respective next element of the list of exit numbers.

14. The navigation server of claim 10, wherein:

each of the plurality of road links is further indicative of a direction of traffic flow;

each of the plurality of link nodes defines the topological connection with regard to either the respective start point or the respective end point of each of the two or more road links connected at the respective link node;

when determining whether more than one road link is connected to the selected road link, a link node of the plurality of link nodes is selected that, if the direction of traffic flow of the selected link node is forward, defines the topological connection with regard to the end point of the selected road link, or, if the direction of traffic flow of the selected link node is backward, defines the topological connection with regard to the start point of the selected road link, wherein only such road links are counted whose respective direction of traffic flow is outgoing from the selected link node; and when selecting one of the road links connected to the selected road link, a road link is selected whose position within the order of the two or more connected road links at the selected link node is equal to the at least one exit number, wherein only such road links are counted within the order whose respective direction of traffic flow is outgoing from the selected link node.

15. The navigation server of claim 10, wherein:

the path data is indicative of a first sub-path of the path and a second sub-path of the path, and comprises a respective start identifier, link count, and at least one exit number for each of the first sub-path and the second sub-path;

the selecting of the start road link and iterative expanding of the path is performed for the first sub-path based on the respective start identifier, link count, and at least one exit number for the first sub-path, until the link count for the first sub-path is equal to the number of road links of the first sub-path; and the selecting of the start road link and iterative expanding of the path is performed for the second sub-path based on the respective start identifier, link count, and at least one exit number for the second sub-path, until the link count for the second sub-path is equal to the number of road links of the second sub-path.

16. The navigation server of claim 10, wherein the path data is further indicative of a path location and comprises at least one of a location identifier, a location index, and a location offset; and wherein the path location is decoded by:

selecting as a location road link a road link of the path based on the location identifier or the location index, if indicated by the path data, or, otherwise, the start road link; and determining the path location as a location within the path, wherein the location is at the start point of the location road link, if the path data is not indicative of the location offset, or, otherwise, the location is offset, along the path into a direction to the end point of the location road link, from the start of the location road link by the location offset.

17. The navigation server of claim 10, wherein the path data is further indicative of a path section and comprises at least one of a section start identifier, a section start index, and a section start offset; and wherein the path section is decoded by:

selecting, as a section start road link, a road link of the path based on the section start identifier or the section start index, if indicated by the path data, or, otherwise, the start road link; and determining a start of the path section, wherein the start is at the start point of the section start road link, if the path data is not indicative of the section start offset, or, otherwise, the start is offset, along the path into a direction to the end point of the section start road link, from the start point of the section start road link by the section start offset.

18. The navigation server of claim 10, wherein the path data is further indicative of a path section and comprises at least one of a section end identifier, a section end index, and a section end offset; and wherein the path section is decoded by:

selecting, as a section end road link, a road link of the path based on the section end identifier or the section end index, if indicated by the path data, or, otherwise, an end road link with which the path has been expanded at the last iteration; and determining an end of the path section, wherein the end is at the end point of the section end road link, if the path data is not indicative of the section end offset, or, otherwise, the end is offset, along the path into a direction to the start point of the section end road link, from the end of the section end road link by the section end offset.

* * * * *